(12) United States Patent
Ogawa et al.

(10) Patent No.: US 9,917,963 B2
(45) Date of Patent: Mar. 13, 2018

(54) INFORMATION PROCESSING DEVICE AND INFORMATION PROCESSING METHOD

(71) Applicants: Minami Ogawa, Tokyo (JP); Tatsuya Shirai, Kanagawa (JP)

(72) Inventors: Minami Ogawa, Tokyo (JP); Tatsuya Shirai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/105,307

(22) PCT Filed: Dec. 15, 2014

(86) PCT No.: PCT/JP2014/083635
§ 371 (c)(1),
(2) Date: Jun. 16, 2016

(87) PCT Pub. No.: WO2015/093582
PCT Pub. Date: Jun. 25, 2015

(65) Prior Publication Data
US 2016/0323463 A1 Nov. 3, 2016

(30) Foreign Application Priority Data

Dec. 19, 2013 (JP) ................................. 2013-262978
Mar. 10, 2014 (JP) ................................. 2014-046666
(Continued)

(51) Int. Cl.
*G06F 3/12* (2006.01)
*H04N 1/00* (2006.01)
*G06F 17/22* (2006.01)

(52) U.S. Cl.
CPC ......... *H04N 1/00464* (2013.01); *G06F 3/123* (2013.01); *G06F 3/1206* (2013.01);
(Continued)

(58) Field of Classification Search
None
See application file for complete search history.

(56) References Cited

U.S. PATENT DOCUMENTS 7,957,021 B2  6/2011  Moroi
8,570,571 B2  10/2013  Moroi
(Continued)

FOREIGN PATENT DOCUMENTS

JP  2008-003833  1/2008
JP  2011-128732  6/2011
(Continued)

OTHER PUBLICATIONS

Extended European Search Report dated Nov. 8, 2016 in Patent Application No. 14872317.4.
(Continued)

*Primary Examiner* — Dung Tran
(74) *Attorney, Agent, or Firm* — Oblon, McClelland, Maier & Neustadt, L.L.P.

(57) ABSTRACT

An information processing device includes: an operation display unit that displays information for a user and receives an input from the user; and an information processing unit including a processor that executes a browser program. The information processing unit includes: a communication unit that functions by the processor executing the browser program, and acquires an operation program and a conversion script that provide a user interface for operating an equipment through the operation display unit; a conversion script processing unit that functions by the processor executing the conversion script on the browser program, analyzes a state of the equipment, and issues an event corresponding to the state of the equipment; and a display control unit that functions by the processor executing the operation program on the browser program, and provides the user interface (Continued)

corresponding to the event through the operation display unit in response to issuance of the event.

8 Claims, 32 Drawing Sheets

(30) Foreign Application Priority Data

Mar. 31, 2014 (JP) .................................. 2014-071323
Dec. 10, 2014 (JP) .................................. 2014-250178

(52) U.S. Cl.
CPC .......... *G06F 3/1207* (2013.01); *G06F 3/1229* (2013.01); *G06F 3/1246* (2013.01); *G06F 3/1285* (2013.01); *G06F 17/2247* (2013.01); *H04N 1/00411* (2013.01); *H04N 2201/0094* (2013.01)

(56) References Cited

U.S. PATENT DOCUMENTS

| | | | |
|---|---|---|---|
| 8,693,018 B2 * | 4/2014 | Ito | G06K 15/005 |
| | | | 358/1.13 |
| 8,823,992 B2 | 9/2014 | Moroi | |
| 8,982,388 B2 * | 3/2015 | Mori | H04N 1/00244 |
| | | | 358/1.14 |
| 9,087,206 B2 * | 7/2015 | Nakashima | G06F 21/608 |
| 9,172,831 B2 | 10/2015 | Moroi | |
| 9,244,640 B2 * | 1/2016 | Nakashima | G06F 3/1236 |
| 9,325,864 B2 | 4/2016 | Ito | |
| 2006/0262349 A1 | 11/2006 | Moroi | |
| 2011/0211222 A1 | 9/2011 | Shogaki | |
| 2011/0242592 A1 * | 10/2011 | Tamura | H04N 1/00204 |
| | | | 358/1.15 |
| 2011/0261398 A1 * | 10/2011 | Mihara | H04N 1/00464 |
| | | | 358/1.15 |
| 2011/0279845 A1 | 11/2011 | Sako | |
| 2011/0310418 A1 | 12/2011 | Miyata | |
| 2012/0268784 A1 * | 10/2012 | Mori | H04N 1/00244 |
| | | | 358/1.15 |
| 2013/0232402 A1 | 9/2013 | Lu et al. | |
| 2013/0293916 A1 * | 11/2013 | Tamura | H04N 1/00204 |
| | | | 358/1.13 |

FOREIGN PATENT DOCUMENTS

| | | |
|---|---|---|
| JP | 2011-151849 | 8/2011 |
| JP | 2012-105071 | 5/2012 |

OTHER PUBLICATIONS

International Search Report dated Mar. 24, 2015 in PCT/JP2014/083635 filed on Dec. 15, 2014.

* cited by examiner

FIG.6

| JOB ID | asdf1234 |
|---|---|

FIG.7

| JOB LIST (SCANNER) | |
|---|---|
| asdf1234 | (SCANNER JOB) |
| qwer5678 | (SCANNER JOB) |
| zxcv9012 | (SCANNER JOB) |

FIG.8

| MACHINE ID | scanner1 | |
|---|---|---|
| JOB INFORMATION | JOB ID | asdf1234 |
| | STATE | WAITING FOR USER OPERATION |
| | DETAILED STATE | WAITING FOR SETTING OF NEXT ORIGINAL |
| | NUMBER OF READING FACES | 3 |

FIG.9

| MACHINE ID | printer1 | |
|---|---|---|
| JOB INFORMATION | JOB ID | ghjk1111 |
| | STATE | INTERRUPTED |
| | DETAILED STATE | CANCELED |
| | NUMBER OF PRINTING FACES | 3 |

FIG.12

| SCANNER JOB | | |
|---|---|---|
| JOB ID | asdf1234 | |
| CURRENT JOB INFORMATION | STATE | WAITING FOR USER OPERATION |
| | DETAILED STATE | WAITING FOR SETTING OF NEXT ORIGINAL |
| | NUMBER OF READING FACES | 3 |
| PRECEDING JOB INFORMATION | STATE | READING |
| | DETAILED STATE | - |
| | NUMBER OF READING FACES | 2 |

FIG.13

| PRINTER JOB | | |
|---|---|---|
| JOB ID | ghjk1111 | |
| CURRENT JOB INFORMATION | STATE | INTERRUPTED |
| | DETAILED STATE | CANCELED |
| | NUMBER OF PRINTING FACES | 4 |
| PRECEDING JOB INFORMATION | STATE | PRINTING |
| | DETAILED STATE | - |
| | NUMBER OF PRINTING FACES | 4 |

FIG.14

| EVENT OF WAITING FOR USER OPERATION FOR SCANNER JOB "asdf1234" ||
|---|---|
| AUTOMATIC RESTART | × |

FIG.15

| INTERRUPTION EVENT FOR PRINTER JOB "ghjk1111" |
|---|

| JOB ID | EVENT |
|---|---|
| asdf1234 | EVENT OF WAITING FOR USER OPERATION |
|  | EVENT OF UPDATING NUMBER OF READING FACES |
| ghjk1111 | INTERRUPTION EVENT |

| MESSAGE | SCANNING |
|---|---|
| CAN IT BE CANCELED? | × |

FIG.32

| MESSAGE | SET NEXT ORIGINAL |
|---|---|
| CAN IT BE CANCELED? | O |
| CAN READING BE ENDED? | O |
| CAN IT BE CONTINUED? | O |
| FUNCTION TO BE EXECUTED WHEN IT IS CANCELED | function(){/*···*/} |
| FUNCTION TO BE EXECUTED WHEN READING IS ENDED | function(){/*···*/} |
| FUNCTION TO BE EXECUTED WHEN IT IS CONTINUED | function(){/*···*/} |

FIG.33

| MESSAGE | PAPER JAM OCCURS |
|---|---|
| CAN IT BE CANCELED? | O |
| CAN READING BE ENDED? | × |
| CAN IT BE CONTINUED? | O |
| FUNCTION TO BE EXECUTED WHEN IT IS CANCELED | function(){/*···*/} |
| FUNCTION TO BE EXECUTED WHEN IT IS CONTINUED | function(){/*···*/} |
| ID | scanner.processing_stopped.scanner_jam |

| ORDER OF EVENT FOR SCANNER JOB | |
|---|---|
| ORDER VALUE | EVENT |
| 1 | START READING |
| 2 | WAITING FOR NEXT ORIGINAL |
| 3 | COMPLETE READING |
| 4 | START TO GENERATE FILE |
| 5 | COMPLETED |

INFORMATION PROCESSING DEVICE AND INFORMATION PROCESSING METHOD

TECHNICAL FIELD

The present invention relates to an information processing device and an information processing method for operating equipment.

BACKGROUND ART

Multifunction peripherals are known that can be operated through a browser program for browsing Web pages. Such multifunction peripherals include an application programming interface (API) for controlling functions as a scanner, a printer, or the like through the browser program. In such multifunction peripherals, the browser program can receive a state change in the scanner, the printer, and the like as an event.

SUMMARY OF THE INVENTION

However, the event notifying of the state change in the scanner and the like includes detailed information about the scanner, the printer, and the like. Accordingly, detailed knowledge about the scanner and the printer is required to develop the Web page for operating the scanner, the printer, and the like through the browser program, so that it has been difficult to develop the Web page.

In view of such a situation, there is a need to provide an information processing device and an information processing method by which an appropriate user interface corresponding to the state of the equipment can be created without detailed knowledge about the equipment.

The present invention is an information processing device that operates equipment. The information processing device includes: an operation display unit that displays information for a user and receives an input from the user; and an information processing unit including a processor that executes a browser program. The information processing unit includes: a communication unit that functions by the processor executing the browser program, and acquires an operation program and a conversion script that provide a user interface for operating the equipment through the operation display unit; a conversion script processing unit that functions by the processor executing the conversion script on the browser program, analyzes a state of the equipment, and issues an event corresponding to the state of the equipment; and a display control unit that functions by the processor executing the operation program on the browser program, and provides the user interface corresponding to the event through the operation display unit in response to issuance of the event.

According to an aspect of the invention, an appropriate user interface corresponding to the state of the equipment can be created without detailed knowledge about the equipment.

BRIEF DESCRIPTION OF DRAWINGS

FIG. 6 is a diagram illustrating an example of a job ID included in a response to a job generation request;

FIG. 7 is a diagram illustrating an example of a job list;

FIG. 8 is a diagram illustrating an example of job information representing an execution state of a scanner;

FIG. 9 is a diagram illustrating an example of the job information representing an execution state of a printer;

FIG. 12 is a diagram illustrating current job information and preceding job information of the scanner;

FIG. 13 is a diagram illustrating current job information and preceding job information of the printer;

FIG. 14 is a diagram illustrating an example of the event corresponding to the job executed by the scanner;

FIG. 15 is a diagram illustrating an example of the event corresponding to the job executed by the printer;

FIG. 32 is a diagram illustrating an example of the user interface information used for generating the user interface corresponding to an event of waiting for a user operation;

FIG. 33 is a diagram illustrating an example of the user interface information used for generating the user interface corresponding to a paper jam occurrence event;

DESCRIPTION OF EMBODIMENTS

The following describes embodiments according to the present invention in detail with reference to the drawings. The invention is not limited to the embodiments.

First Embodiment

Figure 1:
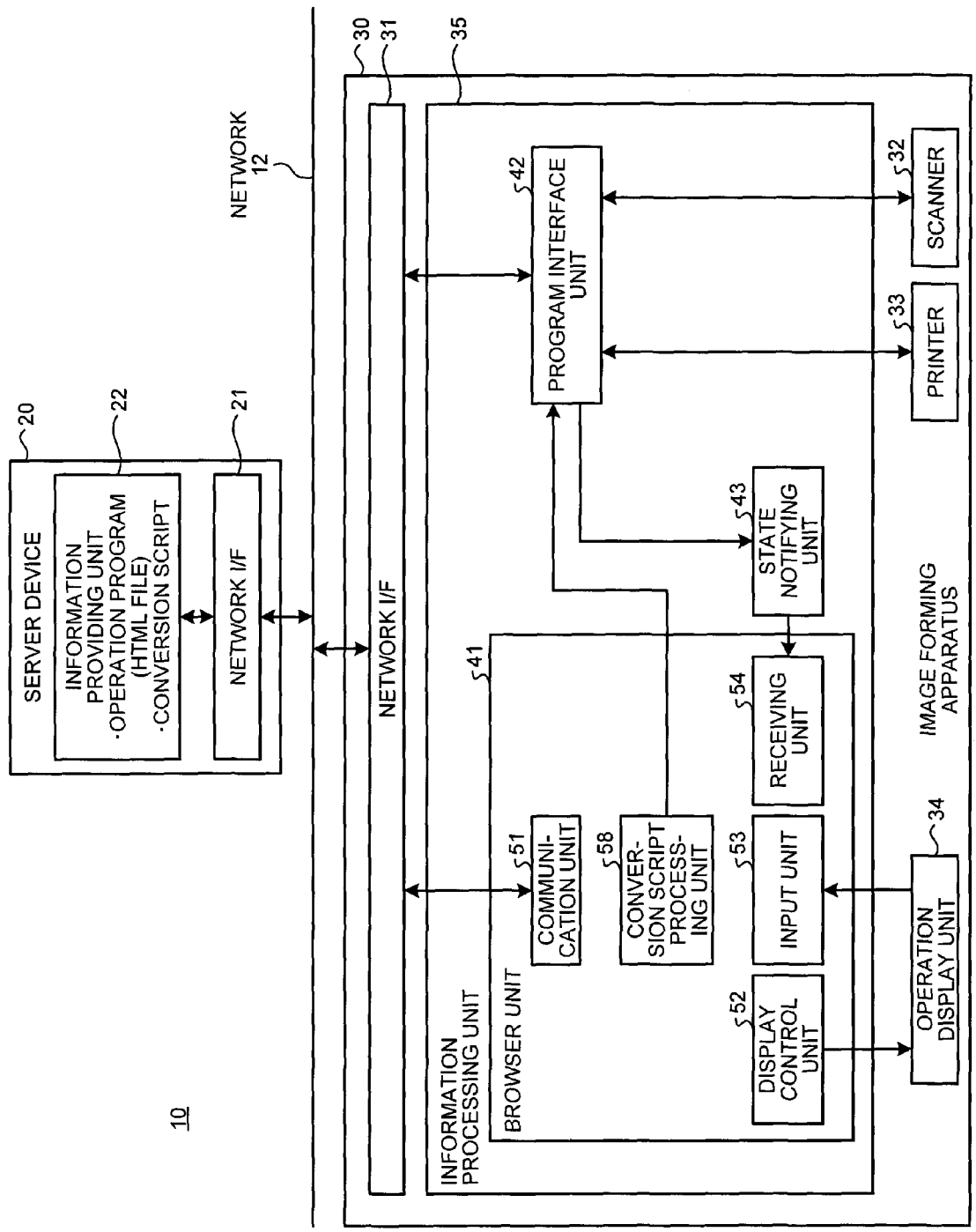
FIG. 1 is a diagram illustrating a configuration of an image forming system according to a first embodiment.

FIG. 1 is a diagram illustrating a configuration of an image forming system 10 according to a first embodiment. The image forming system 10 includes a server device 20 and an image forming apparatus 30.

The server device 20 and the image forming apparatus 30 are connected to each other via a network 12. As an example, the network 12 may be a publicly connected network such as the Internet or a local network such as an intra-company network. The network 12 may be a wired network or a wireless network.

The server device 20 is accessed from the image forming apparatus 30. The server device 20 transmits information to the image forming apparatus 30 and receives information from the image forming apparatus 30 via the network 12.

The server device 20 includes a network I/F 21 and an information providing unit 22. The network I/F 21 is an interface for transmitting/receiving information to/from other devices via the network 12. The information providing unit 22 provides an operation program and a conversion script to the image forming apparatus 30 via the network 12.

The operation program and the conversion script are computer programs downloaded from a browser program to be executed on the browser program. In the embodiment, the operation program is an HTML file described using Hyper-Text Markup Language (HTML). The conversion script is a script program executed on the browser program.

The image forming apparatus 30 includes a network I/F 31, a scanner 32, a printer 33, an operation display unit 34, and an information processing unit 35. The network I/F 31 is an interface for transmitting/receiving information to/from other devices via the network 12.

The printer 33 prints a character, an image, and the like corresponding to data on a sheet, for example. The scanner 32 reads the character, the image, and the like printed on the sheet, and converts them into data. The image forming apparatus 30 may be configured to include only one of the scanner 32 and the printer 33. Alternatively, the image forming apparatus 30 may be configured to include other equipment operated by an information processing device.

The operation display unit 34 displays information for a user and receives an input from the user. As an example, the operation display unit 34 is a touch panel. The operation display unit 34 may include an operation button, a mouse, a keyboard and/or the like.

The information processing unit 35 is an information processing device including a processor. The information processing unit 35 controls the scanner 32 and the printer 33 in response to an operation by the user on the operation display unit 34. The information processing unit 35 executes the browser program, and downloads the operation program (such as an HTML file) and the conversion script from the server device 20 on the browser program. The information processing unit 35 then executes the operation program and the conversion script on the browser program to provide the user interface for operating the scanner 32 and the printer 33.

More specifically, the information processing unit 35 includes a browser unit 41, a program interface unit 42, and a state notifying unit 43. The browser unit 41 functions by the processor executing the browser program.

The program interface unit 42 is a software interface for controlling operations of the scanner 32 and the printer 33 through the browser program. The program interface unit 42 causes the scanner 32 and the printer 33 to execute a job in response to a generation request for the job from the browser program. When the scanner 32 and the printer 33 execute the job, the program interface unit 42 transmits a job ID for identifying the job to a computer program.

The state notifying unit 43 acquires states of the scanner 32 and the printer 33 from the program interface unit 42. The state notifying unit 43 then generates state data representing the acquired state and notifies the browser program of the state data.

In the embodiment, the state notifying unit 43 acquires an execution state of the job by the scanner 32 or the printer 33 from the program interface unit 42. Subsequently, the state notifying unit 43 notifies the browser program of the state data including job information representing the execution state of the job.

The browser unit 41 includes a communication unit 51, a display control unit 52, an input unit 53, a receiving unit 54, and a conversion script processing unit 58.

The communication unit 51 functions by the processor executing the browser program. The communication unit 51 acquires the operation program (such as an HTML file) and the conversion script from the server device 20. The operation program and the conversion script are computer programs that provide the user interface for operating the scanner 32 and the printer 33 through the operation display unit 34.

The display control unit 52 functions by the processor executing the operation program on the browser program. The display control unit 52 controls display on the operation display unit 34. More specifically, the display control unit 52 causes the user interface to be displayed on the operation display unit 34.

The input unit 53 functions by the processor executing the browser program. The input unit 53 inputs an operation by the user on the operation display unit 34. The input unit 53 also inputs an operation on the user interface displayed on the operation display unit 34 when the processor executes the operation program (such as an HTML file) on the browser program.

The receiving unit 54 functions by the processor executing the browser program. The receiving unit 54 receives the state data notified from the state notifying unit 43.

The conversion script processing unit 58 functions by the processor executing the conversion script on the browser program. The conversion script processing unit 58 transmits the job generation request to the program interface unit 42 corresponding to an operation instruction from the user through the user interface. The conversion script processing unit 58 receives and stores the job ID from the program interface unit 42 in response to the job generation request transmitted to the program interface unit 42.

The conversion script processing unit 58 analyzes the state of the scanner 32 or the printer 33 based on the state data received by the receiving unit 54. The conversion script processing unit 58 then issues an event corresponding to the state of the scanner 32 or the printer 33.

In the embodiment, the conversion script processing unit 58 analyzes the execution state of the job by the scanner 32 or the printer 33 based on the state data including the job information, and issues the event corresponding to the execution state of the job. More specifically, the conversion script processing unit 58 stores the job information included in the state data for each job ID, and analyzes whether there is a change in the job information as compared with preceding job information stored for the same job ID, in response to the acquisition of the job information included in the state data. When there is a change in the job information, the conversion script processing unit 58 issues the event corresponding to the execution state of the job.

Subsequently, the display control unit 52 provides the user interface corresponding to the event via the operation display unit 34 in response to issuance of the event from the conversion script processing unit 58.

Figure 2:
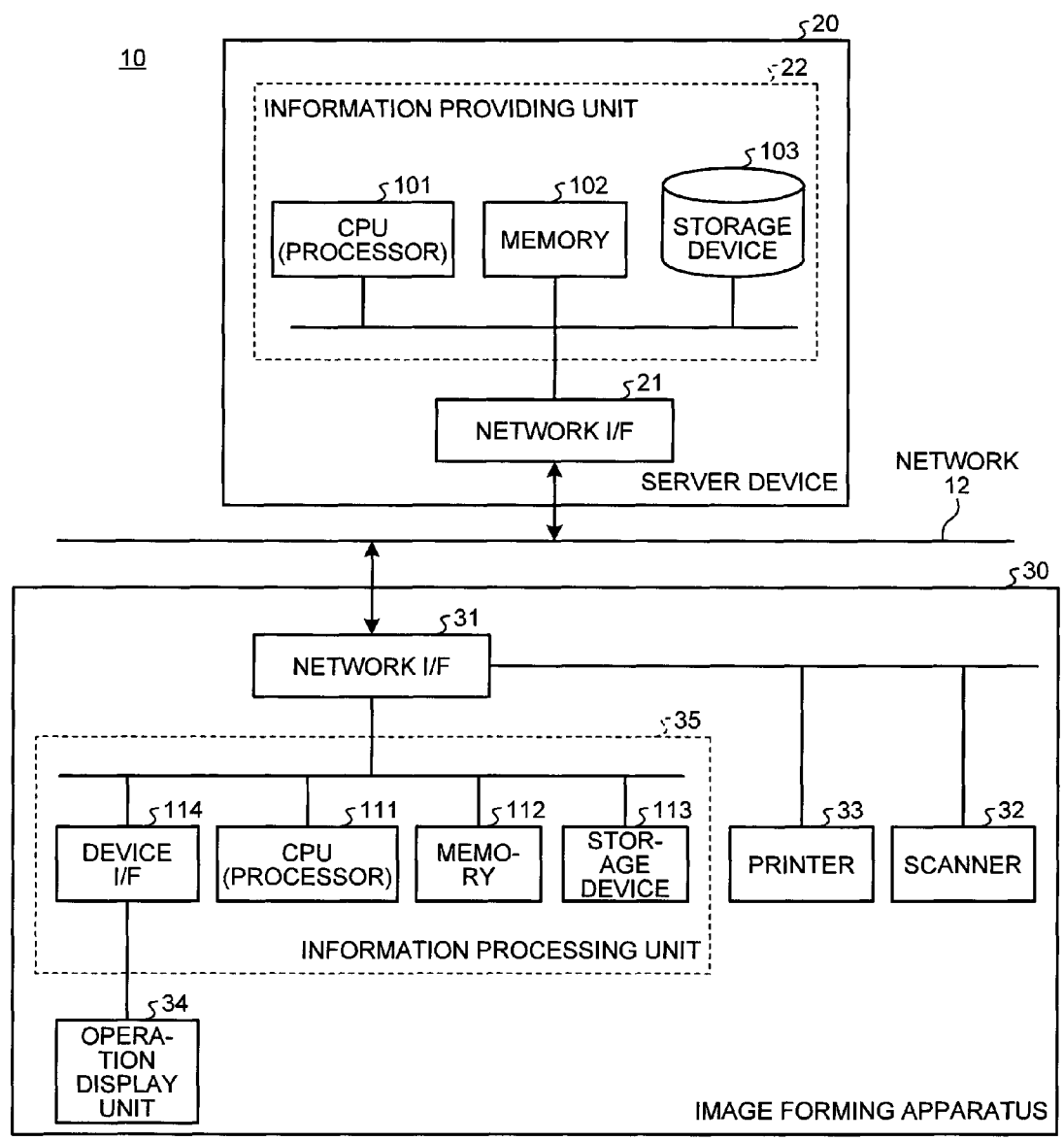
FIG. 2 is a diagram illustrating a hardware configuration of the image forming system according to the first embodiment.

FIG. 2 is a diagram illustrating a hardware configuration of the image forming system 10 according to the first embodiment. As an example, the information providing unit 22 of the server device 20 includes a processor such as a central processing unit (CPU) 101, a memory 102 such as a random access memory (RAM) and a read only memory (ROM), and a storage device 103 such as a hard disk drive (HDD). In the information providing unit 22, the processor such as the CPU 101 executes an operating system and/or the like stored in advance in the storage device 103 to provide the operation program and the conversion script to the image forming apparatus 30.

The information processing unit 35 of the image forming apparatus 30 includes a processor such as a CPU 111, a memory 112 such as a RAM and a ROM, a storage device 113 such as an HDD, and a device I/F 114 serving as an interface with respect to the operation display unit 34. In the information processing unit 35, the processor such as the CPU 111 loads and executes, on the memory 112, the operating system and the browser program stored in advance in the storage device 113.

Subsequently, the processor such as the CPU 111 downloads the operation program and the conversion script from the server device 20 via the network 12, and loads and executes the operation program and the conversion script on the memory 112. Such an operation program and a conversion script have a module configuration including a display control module, an input module, and a script processing module. When the processor such as the CPU 111 executes these modules, the information processing unit 35 is enabled to function as the display control unit 52, the input unit 53, and the conversion script processing unit 58.

Figure 3:
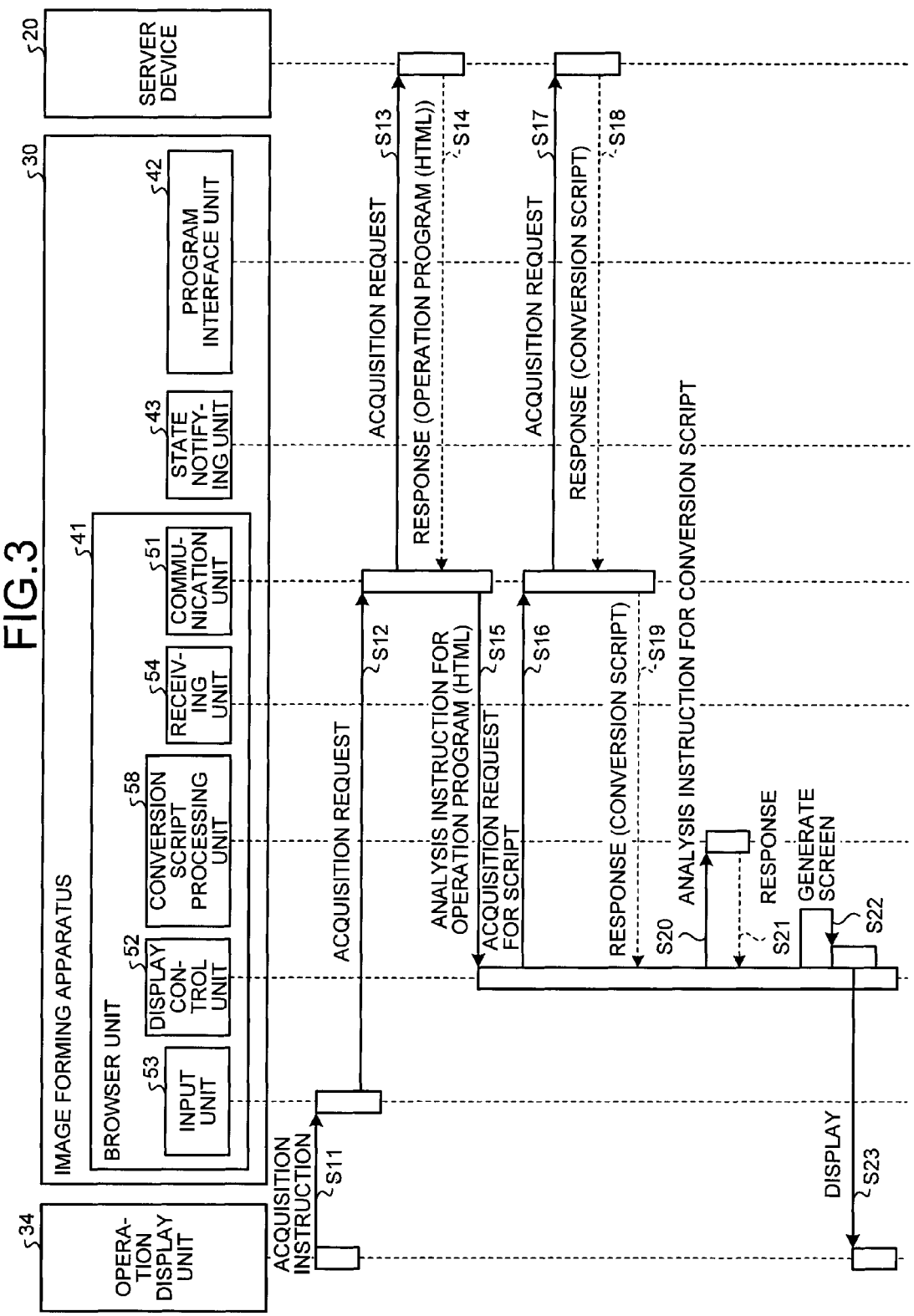
FIG. 3 is a sequence diagram of the image forming system according to the first embodiment when processing is started.

FIG. 3 is a sequence diagram of the image forming system 10 according to the first embodiment when processing is started. First, the user executes the browser program and inputs uniform resource identifiers (URI) or the like indicating a storage place of the HTML file serving as the operation program to the browser program to instruct to download the HTML file. When the download of the HTML file is instructed by the user, the operation display unit 34 gives an acquisition instruction to the input unit 53 of the browser unit 41 at Step S11. Subsequently, the input unit 53 gives the acquisition request corresponding to the acquisition instruction to the communication unit 51 at Step S12.

The communication unit 51 then transmits the acquisition request for the HTML file to the server device 20 at Step S13. Next, the server device 20 transmits a response including the HTML file to the communication unit 51 at Step S14. Subsequently, the communication unit 51 extracts the HTML file from the response and gives an analysis instruction for the extracted HTML file to the display control unit 52 at Step S15.

When receiving the analysis instruction, the display control unit 52 analyzes the HTML file. The HTML file includes a call request for the conversion script and the URI indicating the storage place of the conversion script. The display control unit 52 then gives the acquisition request for the conversion script to the communication unit 51 at Step S16. When the HTML file includes an image file, cascading style sheets (CSS), other scripts, and/or the like as a result of analysis, the display control unit 52 also gives the acquisition request for those to the communication unit 51.

The communication unit 51 then transmits the acquisition request for the conversion script to the server device 20 at Step S17. Next, the server device 20 transmits the response including the conversion script to the communication unit 51 at Step S18. Subsequently, the communication unit 51 transmits the response including the conversion script to the display control unit 52 at Step S19.

When receiving the response to the acquisition request for the conversion script, the display control unit 52 extracts the conversion script from the response. Subsequently, the display control unit 52 gives the analysis instruction for the extracted conversion script to the conversion script processing unit 58 at Step S20. When receiving the analysis instruction, the conversion script processing unit 58 analyzes the conversion script and is caused to be in a standby state for execution of the conversion script. Subsequently, after the analysis is finished, the conversion script processing unit 58 transmits the response to the display control unit 52 at Step S21.

The display control unit 52 then generates a screen including the user interface for controlling the scanner 32 and the printer 33 based on the analysis result of the HTML file at Step S22. Subsequently, the display control unit 52 displays the generated screen on the operation display unit 34 at Step S23.

Through the above processing, the information processing unit 35 can acquire the HTML file (operation program) and the conversion script from the server device 20. The information processing unit 35 can also display the screen for operating and controlling the scanner 32 and the printer 33 by the browser program.

Figure 4:
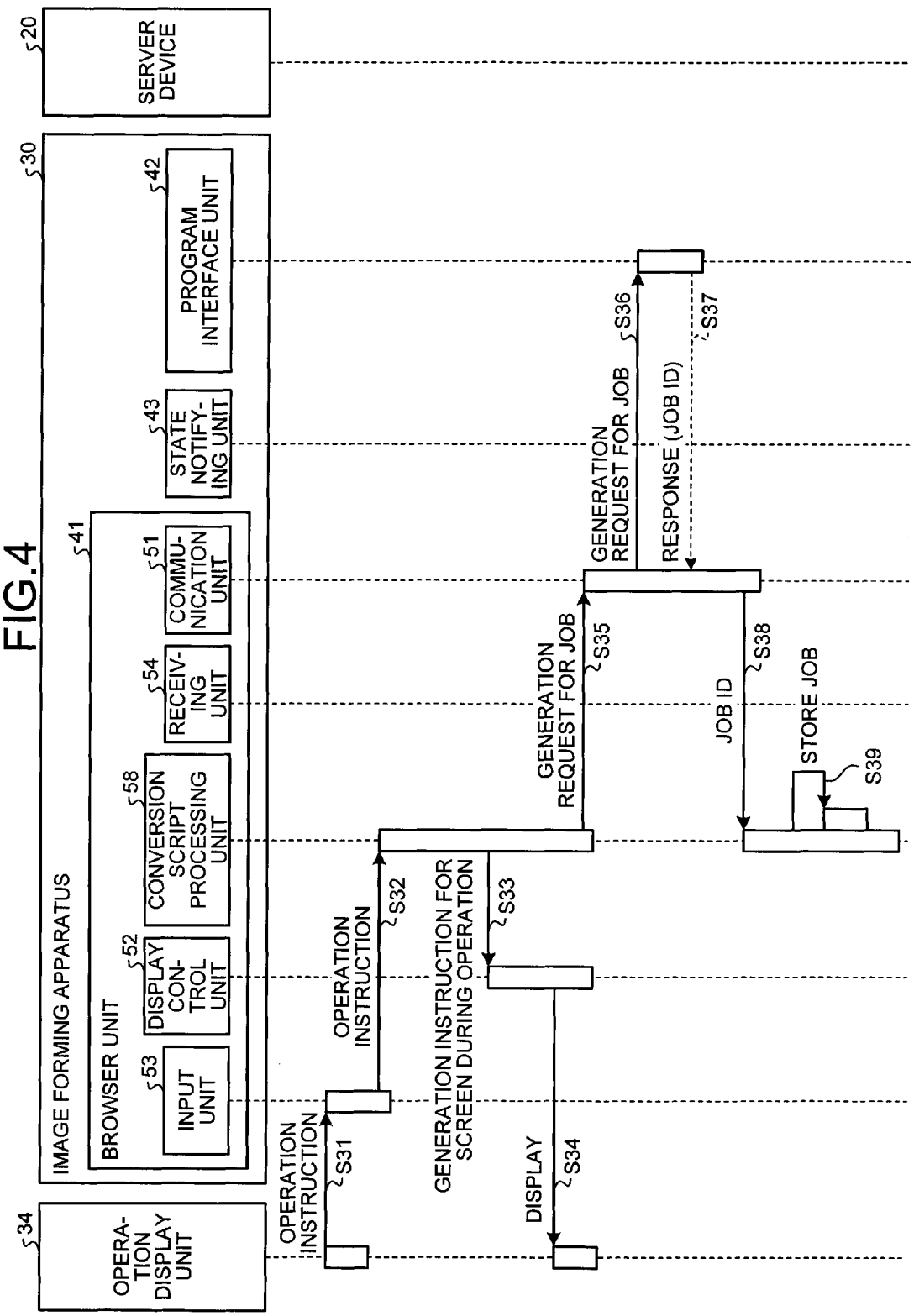
FIG. 4 is a sequence diagram of the image forming system according to the first embodiment when a job is generated.

FIG. 4 is a sequence diagram of the image forming system 10 according to the first embodiment when the job is generated. After the execution of the sequence illustrated in FIG. 3 is completed, the sequence illustrated in FIG. 4 is executed in the image forming system 10.

The user operates the user interface displayed on the operation display unit 34 to give the operation instruction for the scanner 32 or the printer 33 to the operation display unit 34. For example, the user operates the user interface to give, to the operation display unit 34, an operation starting instruction for the scanner 32 or the printer 33 and setting information such as a resolution or a distinction between monochrome and color.

When receiving such an operation instruction, first, the operation display unit 34 gives the operation instruction to the input unit 53 of the browser unit 41 at Step S31. The input unit 53 then gives the operation instruction to the conversion script processing unit 58 at Step S32. When receiving the operation instruction, the conversion script processing unit 58 gives a generation instruction for a screen of when in operation to the display control unit 52 at Step S33.

Subsequently, when receiving the generation instruction for the screen, the display control unit 52 generates the screen of when in operation. The display control unit 52 then displays the generated screen on the operation display unit 34 at Step S34.

On the other hand, when receiving the operation instruction from the input unit 53, the conversion script processing unit 58 transmits a generation request for a job including processing content according to the operation instruction to the communication unit 51 at Step S35. Subsequently, the communication unit 51 transmits the job generation request to the program interface unit 42 at Step S36. In response to the reception of the job generation request, the program interface unit 42 causes the scanner 32 or the printer 33 to execute the job according to the operation instruction.

At Step S37, the program interface unit 42 then transmits the response to the communication unit 51 according to causing the scanner 32 or the printer 33 to execute the job. In this case, when the job is successfully generated, the program interface unit 42 causes the response to include the job ID for identifying the generated job and the job information representing the execution state of the current job. The communication unit 51 then extracts the job ID and the job information from the received response, and transmits the job ID and the job information to the conversion script processing unit 58 at Step S38. Subsequently, when receiving the job ID and the job information, the conversion script processing unit 58 stores the job ID and stores the job information in association with the job ID at Step S39.

Through the above processing, when receiving the operation instruction for the scanner 32 or the printer 33, the information processing unit 35 can display a user interface screen indicating in-operation. The information processing unit 35 can also cause the scanner 32 or the printer 33 to execute the job according to the operation instruction, and store the job ID for identifying the executed job and the job information representing the execution state of the job.

Figure 5:
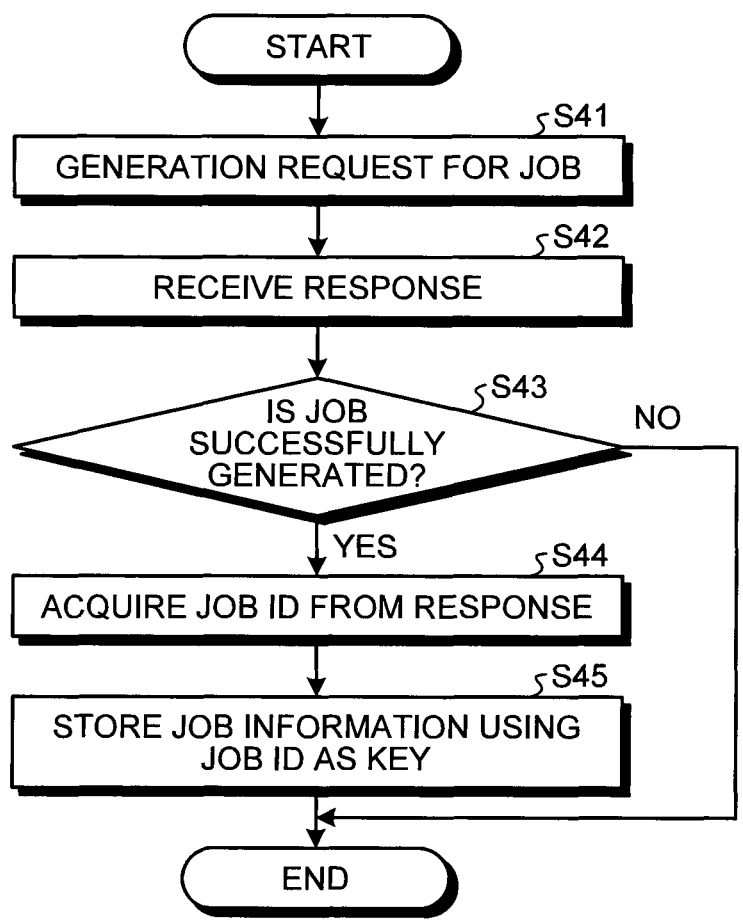
FIG. 5 is a diagram illustrating a processing flow of a conversion script processing unit when the job is generated.

FIG. 5 is a diagram illustrating a processing flow of the conversion script processing unit 58 when the job is generated. When receiving the operation instruction from the input unit 53, the conversion script processing unit 58 starts processing from Step S41.

First, the conversion script processing unit 58 transmits the generation request for a job including processing content according to the operation instruction to the program interface unit 42 at Step S41. Next, the conversion script processing unit 58 receives a response to the job generation request at Step S42. Subsequently, the conversion script processing unit 58 analyzes content of the response to determine whether the job is successfully generated at Step S43. If the job is not successfully generated (No at Step S43), the conversion script processing unit 58 ends this procedure. If the job is successfully generated (Yes at Step S43), the conversion script processing unit 58 advances the process to Step S44.

At Step S44, the conversion script processing unit 58 acquires the job ID included in the response. For example, the conversion script processing unit 58 acquires the job ID as illustrated in FIG. 6.

Subsequently, the conversion script processing unit 58 stores the job ID together with the job information representing the execution state of the job in association with the job ID at Step S45. For example, the conversion script processing unit 58 stores the job ID and the job information using a job list as illustrated in FIG. 7.

For example, the conversion script processing unit 58 acquires the job information as illustrated in FIG. 8. The job information in FIG. 8 represents that the state of the scanner 32 is "waiting for a user operation", a detailed state is "waiting for setting of the next original", and the number of reading faces is "3", for example. The job information representing the execution state of the job by the scanner 32 may include a reading state, a URI of a read image, a URI of a thumbnail, a transmission state, the number of transmitted destinations, and the like.

For example, the conversion script processing unit 58 may acquire the job information as illustrated in FIG. 9. The job information in FIG. 9 represents that the state of the printer 33 is "interrupted", the detailed state is "canceled", and the number of printing faces is "3". The job information representing the execution state of the job by the printer 33 may also include a printing state and whether reading of the file is completed.

When the job ID and the job information are completely stored in the conversion script processing unit 58, the conversion script processing unit 58 ends this procedure.

Figure 10:
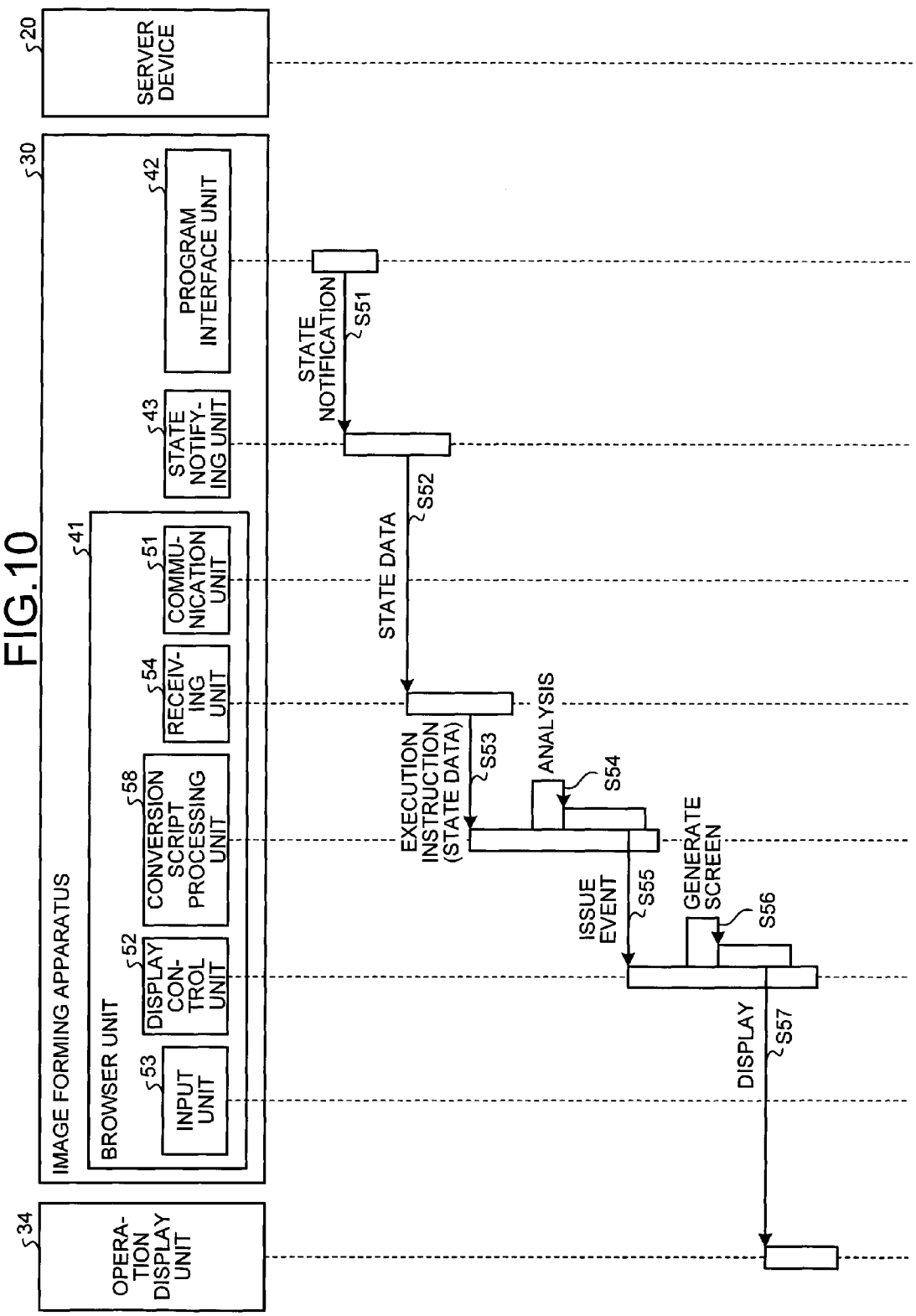
FIG. 10 is a sequence diagram of the image forming system according to the first embodiment when an event is issued.

FIG. 10 is a sequence diagram of the image forming system 10 according to the first embodiment when the event is issued. After the execution of the sequence illustrated in FIG. 4 is completed, the sequence illustrated in FIG. 10 is executed in the image forming system 10.

First, at Step S51, the program interface unit 42 notifies the state notifying unit 43 of the state of the scanner 32 or the printer 33 executing the job. As an example, the program interface unit 42 notifies the state when requested from the state notifying unit 43 or at regular intervals.

The state notifying unit 43 acquires the execution state of the job by the scanner 32 or the printer 33 due to the notification from the program interface unit 42. Subsequently, at Step S52, the state notifying unit 43 notifies the receiving unit 54 of the browser program of the state data including the job information representing the execution state of the job by the scanner 32 or the printer 33.

At Step S53, when the state data is notified from the state notifying unit 43, the receiving unit 54 then gives an execution instruction for the conversion script to the conversion script processing unit 58. In this case, the receiving unit 54 causes the execution instruction to include the state data.

Subsequently, at Step S54, the conversion script processing unit 58 executes the conversion script to analyze the execution state of the job based on the job information included in the state data. At Step S55, the conversion script processing unit 58 then issues the event corresponding to the execution state of the job to the display control unit 52 based on the execution state of the job represented in the job information.

Next, at Step S56, the display control unit 52 generates a screen including the user interface corresponding to the issued event. At Step S57, the display control unit 52 displays the generated screen on the operation display unit 34.

Through the above processing, the information processing unit 35 can acquire the execution state of the job by the scanner 32 or the printer 33 from the program interface unit 42. The information processing unit 35 can also give the event corresponding to the execution state of the job by the scanner 32 or the printer 33 to the display control unit 52. The information processing unit 35 can display the user interface screen suitable for the execution state of the job based on the event corresponding to the execution state of the job.

Figure 11:
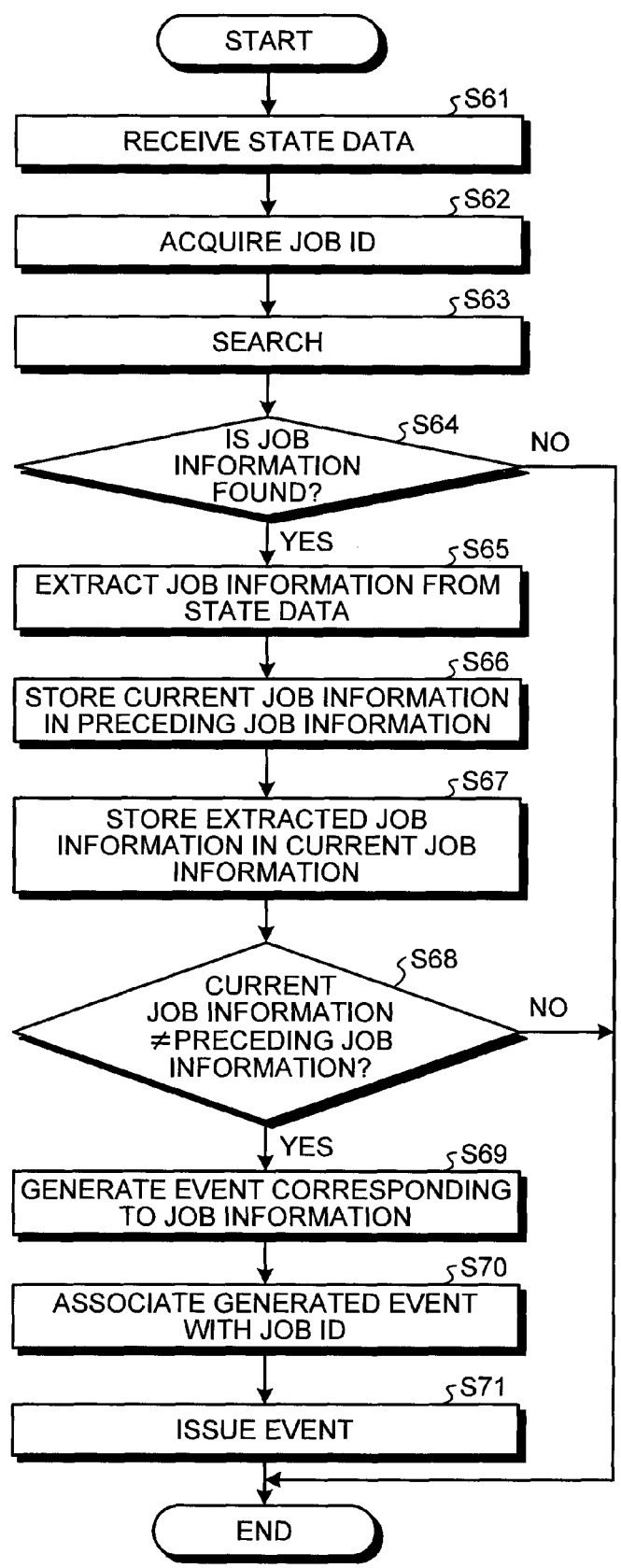
FIG. 11 is a diagram illustrating a processing flow of the conversion script processing unit when the event is issued.

FIG. 11 is a diagram illustrating a processing flow of the conversion script processing unit 58 when the event is issued. When receiving the notification of the state data from the program interface unit 42, the conversion script processing unit 58 starts processing from Step S61.

First, at Step S61, the conversion script processing unit 58 receives the state data. Next, at Step S62, the conversion script processing unit 58 acquires the job ID from the state data.

Subsequently, at Step S63, the conversion script processing unit 58 searches a stored job list using the job ID to retrieve the job information associated with the job ID. At Step S64, the conversion script processing unit 58 then determines whether the job information is found. If the job information is not found (No at Step S64), this procedure is ended. If the job information is found (Yes at Step S64), the process proceeds to Step S65.

At Step S65, the conversion script processing unit 58 extracts the job information included in the received state data. At Step S66, the conversion script processing unit 58 then stores, in a column of preceding job information, the current job information stored in association with the job ID included in the state data. Subsequently, at Step S67, the conversion script processing unit 58 stores, in a column of current job information, the job information extracted from the received state data.

For example, as illustrated in FIG. 12, the conversion script processing unit 58 separately stores the current job information and the preceding job information as the job information of a certain job ID corresponding to the job executed by the scanner 32. For example, as illustrated in FIG. 13, the conversion script processing unit 58 separately stores the current job information and the preceding job information as the job information of a certain job ID corresponding to the job executed by the printer 33. That is, at Step S66 and Step S67, the conversion script processing unit 58 stores the current job information in the preceding job information, and stores newly acquired job information in the current job information.

Subsequently, at Step S68, the conversion script processing unit 58 compares the current job information with the preceding job information to determine whether there is a change. That is, the conversion script processing unit 58 determines whether there is a change in the execution state of the job. If there is no change (No 30, at Step S68), the conversion script processing unit 58 ends this procedure. If there is a change (Yes at Step S68), the conversion script processing unit 58 advances the process to Step S69.

Subsequently, at Step S69, the conversion script processing unit 58 generates the event. That is, the conversion script processing unit 58 generates the event corresponding to the execution state of the job.

For example, the conversion script processing unit 58 issues an event of waiting for a user operation indicating that the job executed by the scanner 32 is waiting for a user operation as illustrated in FIG. 14. As an example, the conversion script processing unit 58 issues such an event when the execution state of the job by the scanner 32 is changed from a state under processing to a state of waiting for a user operation. The event illustrated in FIG. 14 also includes information representing that the scanner 32 does not automatically restart.

For example, the conversion script processing unit 58 issues an interruption event indicating that the job executed by the printer 33 is interrupted as illustrated in FIG. 15. As an example, the conversion script processing unit 58 issues such an event when the printer 33 is forcibly terminated due to a problem in a system and the like.

In addition, for example, the conversion script processing unit 58 may issue a standby event indicating that equipment is in a standby state, a processing event indicating that the equipment is under processing, a cancellation event indicating that the job is canceled through a canceling operation by the user, a completion event indicating that the job is completed, an event of updating the number of reading faces indicating that the number of reading faces is updated, an event of updating the number of printing faces indicating that the number of printing faces is updated, and the like.

The conversion script processing unit 58 may issue two or more events at the same time. For example, when the execution state of the job by the scanner 32 is changed from the state under processing to the state of waiting for a user operation and the number of reading faces is changed from 2 to 3, the conversion script processing unit 58 may issue the event of waiting for a user operation and the event of updating the number of reading faces at the same time.

Subsequently, at Step S70, the conversion script processing unit 58 associates the generated event with the job ID. For example, as illustrated in FIG. 16, the conversion script processing unit 58 lists and stores the generated event for each job ID.

At Step S71, the conversion script processing unit 58 then issues the generated event to the display control unit 52. After issuing the event, the conversion script processing unit 58 ends this procedure.

Figures 16, 17:
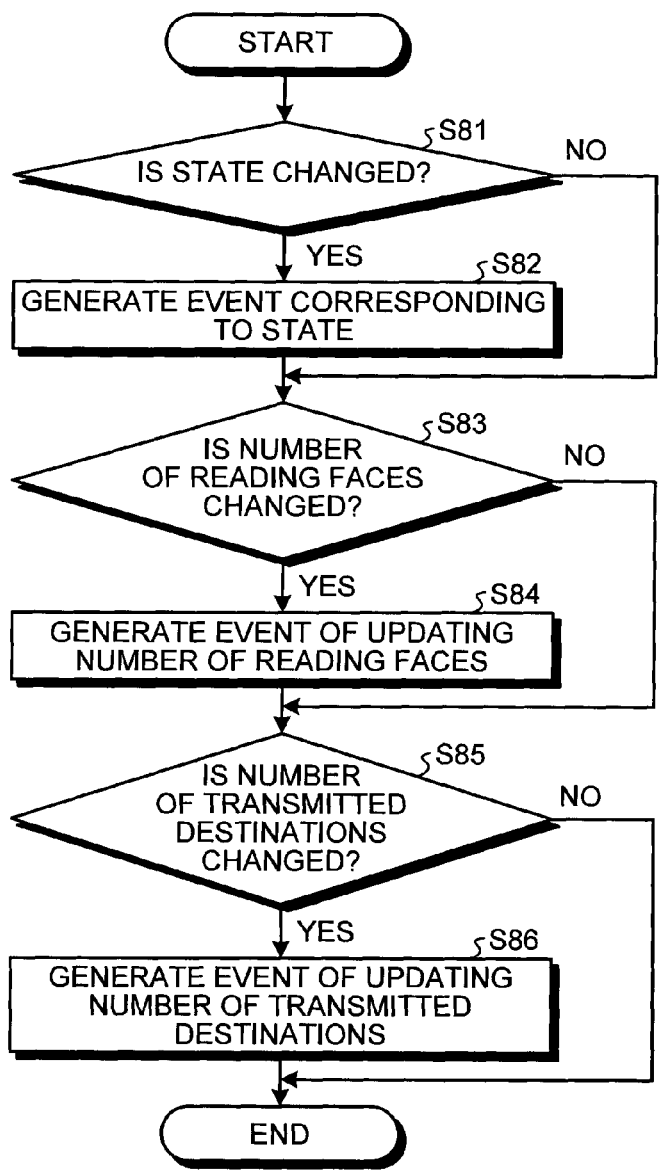
FIG. 16 is a diagram illustrating an example of the event associated with the job ID.
FIG. 17 is a diagram illustrating an example of a generation procedure of the event corresponding to the job of the scanner.

FIG. 17 is a diagram illustrating an example of a generation procedure of the event corresponding to the job of the scanner 32. At Step S69 in FIG. 11, the conversion script processing unit 58 generates the event corresponding to the job of the scanner 32 according to the procedure illustrated in FIG. 17, for example.

First, at Step S81, the conversion script processing unit 58 determines whether the state is changed with reference to the job information. If the state is changed (Yes at Step S81), the event corresponding to the changed state is generated at Step S82. If the state is not changed (No at Step S81), and when the process at Step S82 is ended, the conversion script processing unit 58 advances the process to Step S83.

Next, at Step S83, the conversion script processing unit 58 determines whether the number of reading faces is changed with reference to the job information. If the number of reading faces is changed (Yes at Step S83), the event of updating the number of reading faces is generated at Step S84. If the number of reading faces is not changed (No at Step S83), and when the process at Step S84 is ended, the conversion script processing unit 58 advances the process to Step S85.

Subsequently, at Step S85, the conversion script processing unit 58 determines whether the number of transmitted destinations is changed with reference to the job information. If the number of transmitted destinations is changed (Yes at Step S85), the event of updating the number of transmitted destinations is generated at Step S86. If the number of transmitted destinations is not changed (No at Step S85), and when the process at Step S86 is ended, the conversion script processing unit 58 ends this procedure.

Figure 18:
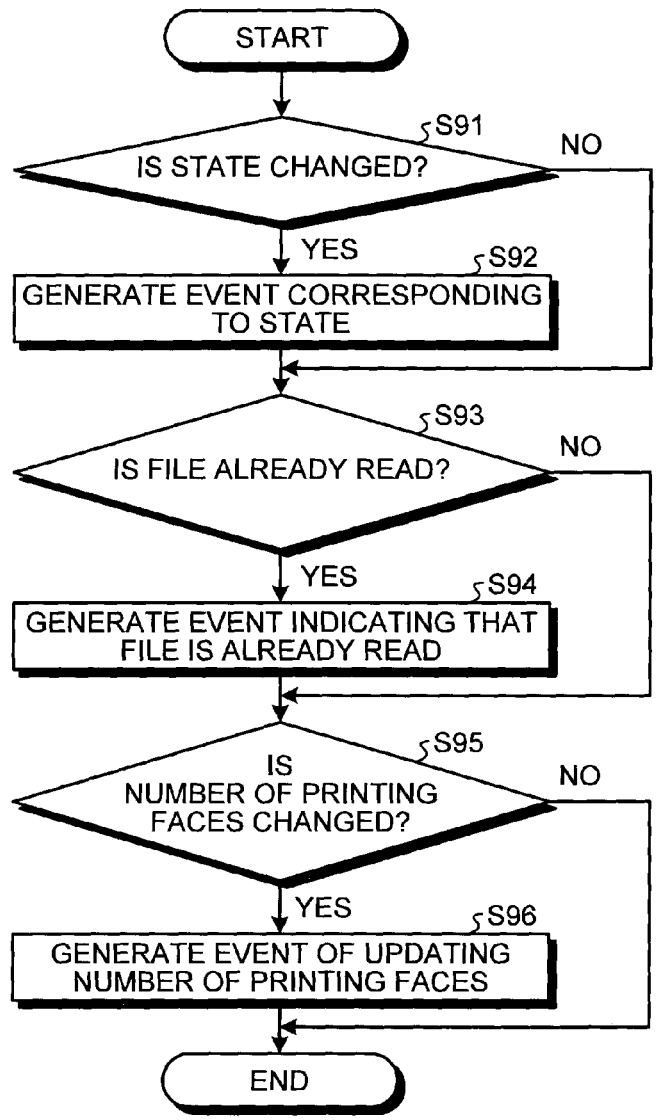
FIG. 18 is a diagram illustrating an example of the generation procedure of the event corresponding to the job of the printer.

FIG. 18 is a diagram illustrating an example of the generation procedure of the event corresponding to the job of the printer 33. At Step S69 in FIG. 11, the conversion script processing unit 58 generates the event corresponding to the job of the printer 33 according to the procedure illustrated in FIG. 18, for example.

First, at Step S91, the conversion script processing unit 58 determines whether the state is changed with reference to the job information. If the state is changed (Yes at Step S91), the event corresponding to the changed state is generated at Step S92. If the state is not changed (No at Step S91), and when the process at Step S92 is ended, the conversion script processing unit 58 advances the process to Step S93.

Next, at Step S93, the conversion script processing unit 58 determines whether the file is already read with reference to the job information. If the file is already read (Yes at Step S93), an event indicating that the file is already read is generated at Step S94. If the file is not already read (No at Step S93), and when the process at Step S94 is ended, the conversion script processing unit 58 advances the process to Step S95.

Subsequently, at Step S95, the conversion script processing unit 58 determines whether the number of printing faces is changed with reference to the job information. If the number of printing faces is changed (Yes at Step S95), the event of updating the number of printing faces is generated at Step S96. If the number of printing faces is not changed (No at Step S95), and when the process at Step S96 is ended, the conversion script processing unit 58 ends this procedure.

Figure 19:
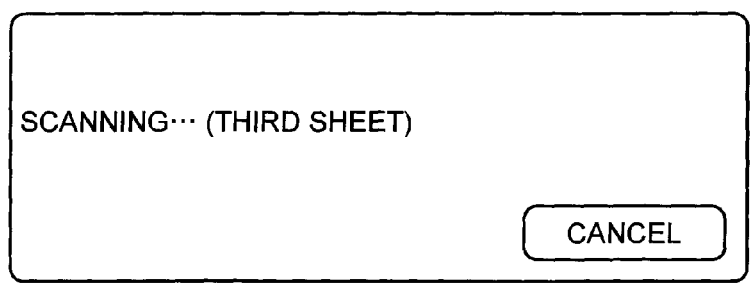
FIG. 19 is a diagram illustrating an example of a user interface displayed in accordance with the event that is issued during when the job is processed.

FIG. 19 illustrates an example of the user interface displayed in accordance with the processing event. When the job is under processing, the conversion script processing unit 58 issues the processing event. When the processing event is issued, for example, the display control unit 52 displays the user interface indicating the state under processing and progress of the processing as illustrated in FIG. 19.

Figure 20:
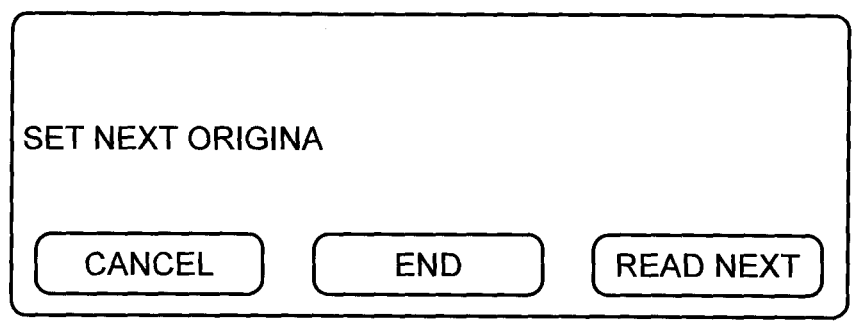
FIG. 20 is a diagram illustrating an example of the user interface displayed in accordance with the event that is issued during standby for a user operation.

FIG. 20 illustrates an example of the user interface displayed in accordance with the event of waiting for a user operation. When the job is waiting for a user operation, the conversion script processing unit 58 issues the event of waiting for a user operation. When the event of waiting for a user operation is issued, for example, the display control unit 52 displays the user interface that instructs the user operation as illustrated in FIG. 20.

Figure 21:
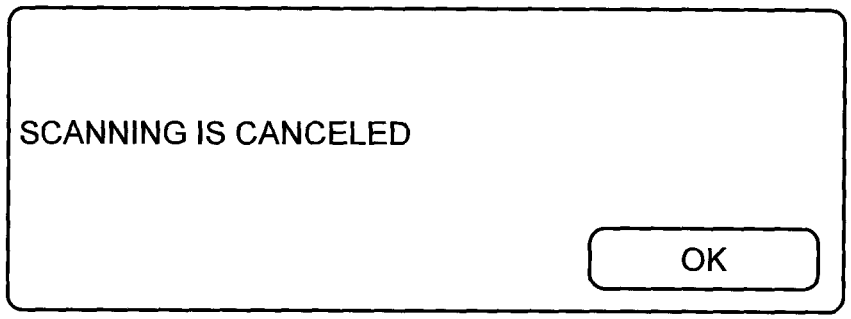
FIG. 21 is a diagram illustrating an example of the user interface displayed in accordance with the event that is issued when the job is canceled.

FIG. 21 illustrates an example of the user interface displayed in accordance with the cancellation event. When the job is canceled, the conversion script processing unit 58 issues the cancellation event. When the cancellation event is issued, for example, the display control unit 52 displays the user interface notifying that the job is canceled as illustrated in FIG. 21.

As described above, the image forming system 10 according to the embodiment analyzes the execution state of the job by the scanner 32 or the printer 33 and issues the event corresponding to the execution state when the conversion script processing unit 58 executes the conversion script. When the display control unit 52 executes the HTML file (operation program), the user interface corresponding to the event is provided.

Accordingly, the image forming system 10 according to the embodiment can issue an appropriate event corresponding to the execution state of the job by the scanner 32 or the printer 33 by calling the conversion script created in advance as the HTML file. Accordingly, the image forming system 10 according to the embodiment can easily create the HTML file (operation program) for providing the user interface without detailed knowledge for understanding the state of the scanner 32 and the printer 33.

In the embodiment, the conversion script processing unit 58 may issue not only the event corresponding to the execution state of the job but also an event corresponding to the state of the scanner 32 and the printer 33 not executing the job. The state notifying unit 43 monitors the state of the scanner 32 and the printer 33. When the state of the scanner 32 and the printer 33 is changed, the state notifying unit 43 notifies the browser program of the state data indicating the changed state. In this case, the sequence illustrated in FIG. 10 is performed to issue the event and display the user interface.

Figure 22:
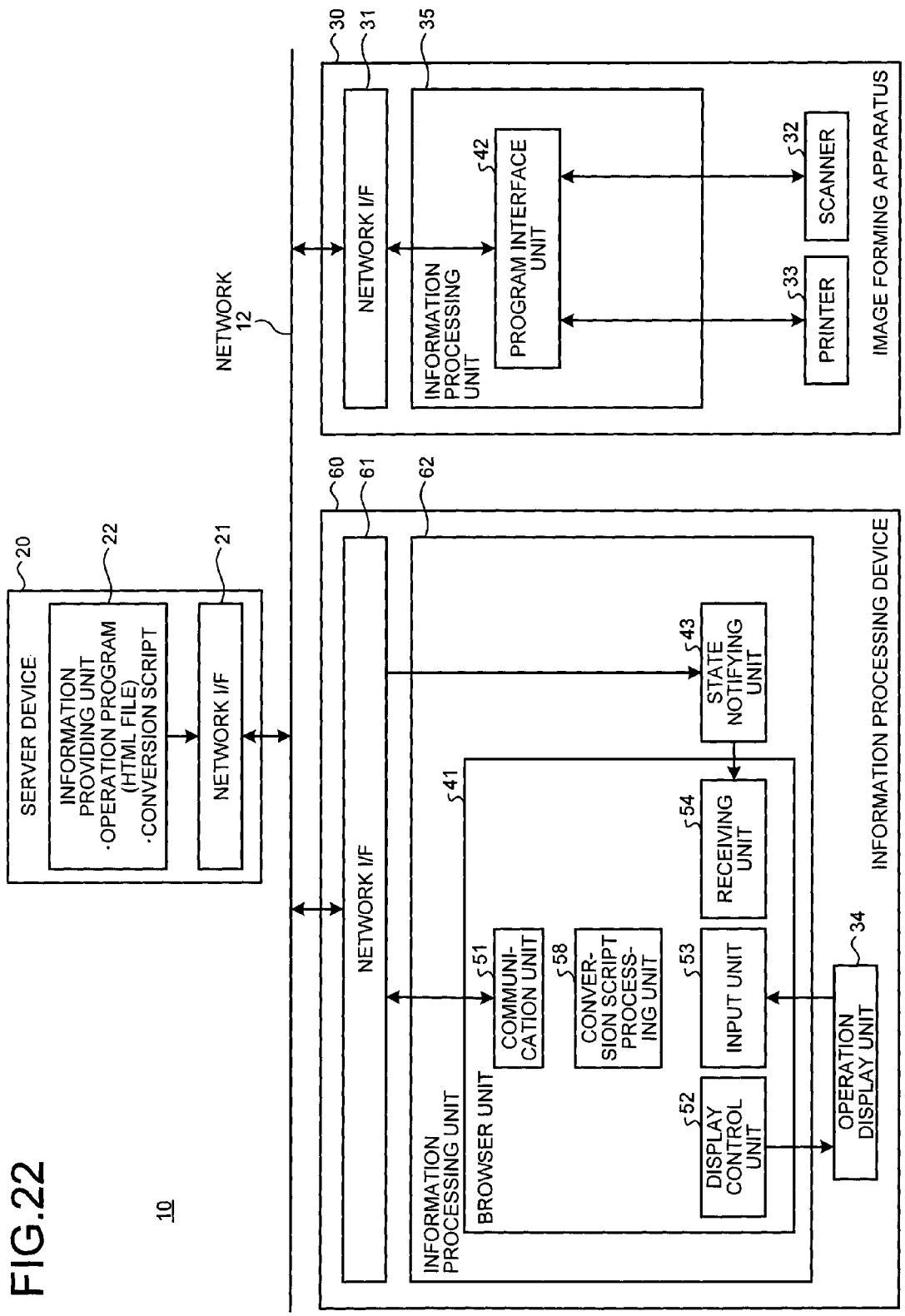
FIG. 22 is a diagram illustrating a configuration of an image forming system according to a first modification.

FIG. 22 is a diagram illustrating a configuration of the image forming system 10 according to a first modification of the first embodiment. In the first modification and a second modification, components having the same function and configuration as those in FIG. 1 are denoted by the same reference numerals, and only differences will be described.

The image forming system 10 according to the first modification includes the server device 20, the image forming apparatus 30, and an information processing device 60. The image forming apparatus 30 according to the first modification includes the network I/F 31, the scanner 32, the printer 33, and the information processing unit 35, and does not include the operation display unit 34. The information processing unit 35 includes the program interface unit 42, and does not include the browser unit 41 and the state notifying unit 43.

The information processing device 60 includes a network I/F 61, an information processing unit 62, and the operation display unit 34. The network I/F 61 has the same function and configuration as those of the network I/F 31. The information processing unit 62 includes the browser unit 41 and the state notifying unit 43. A hardware configuration of the information processing unit 62 is the same as that of the information processing unit 35.

In the first modification, the program interface unit 42 communicates with the browser unit 41 and the state notifying unit 43 via the network 12.

In the image forming system 10 according to the first modification of the first embodiment, the information processing device for operation can be separated from the image forming apparatus 30.

Figure 23:
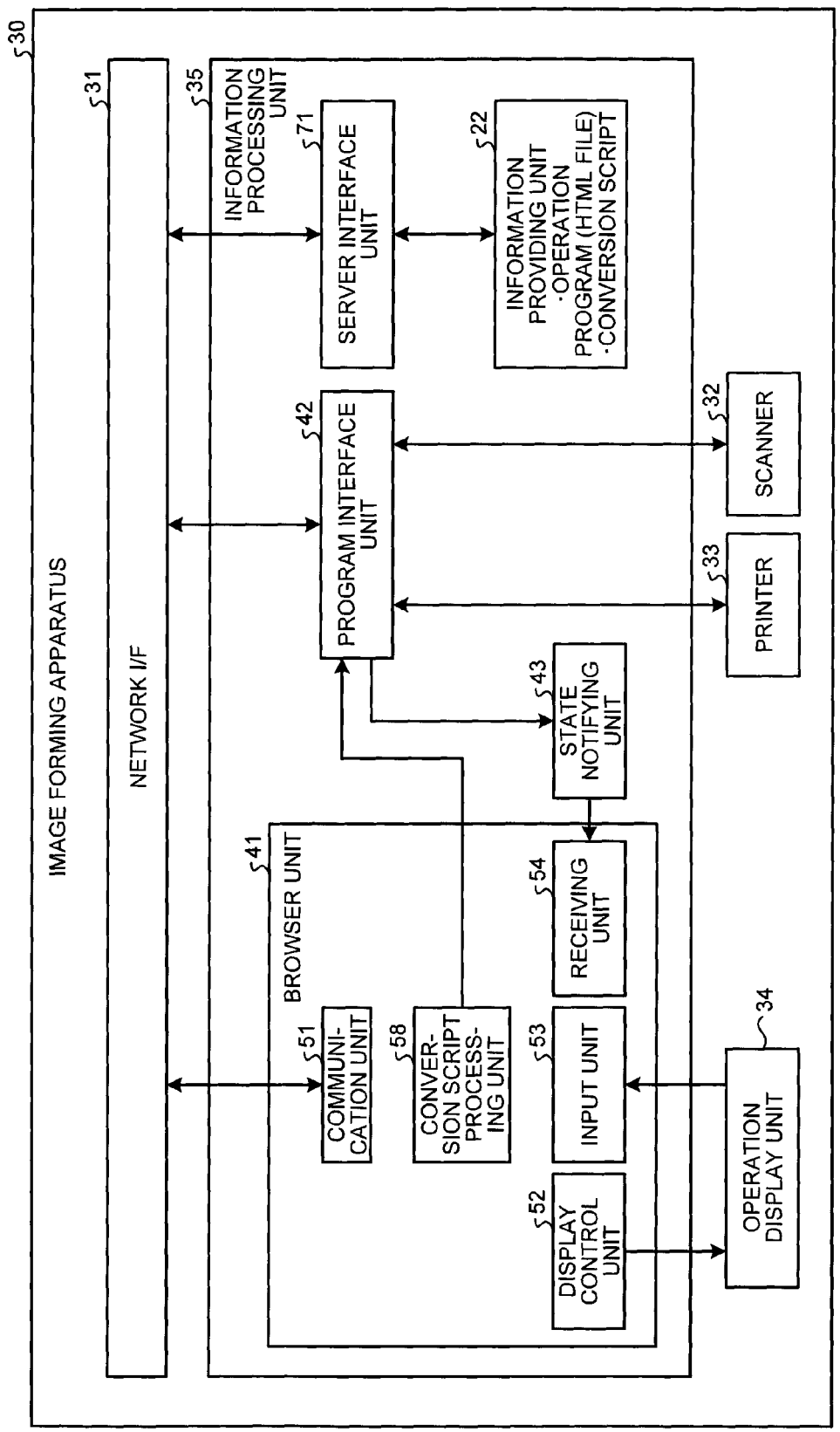
FIG. 23 is a diagram illustrating a configuration of an image forming apparatus according to a second modification.

FIG. 23 is a diagram illustrating a configuration of the image forming apparatus 30 according to the second modification of the first embodiment. The information processing unit 35 according to the second modification further includes a server interface unit 71 and the information providing unit 22.

The server interface unit 71 is a software interface to access the information providing unit 22 from the browser program. In the information processing unit 35, the scanner 32 and the printer 33, the information processing device for operation, and the information providing unit 22 that stores the operation program and the conversion script are integrated with each other.

In the image forming apparatus 30 according to the second modification of the first embodiment, the operation program and the conversion script can be acquired without accessing the server device 20 via the network 12.

Second Embodiment

Figure 24:
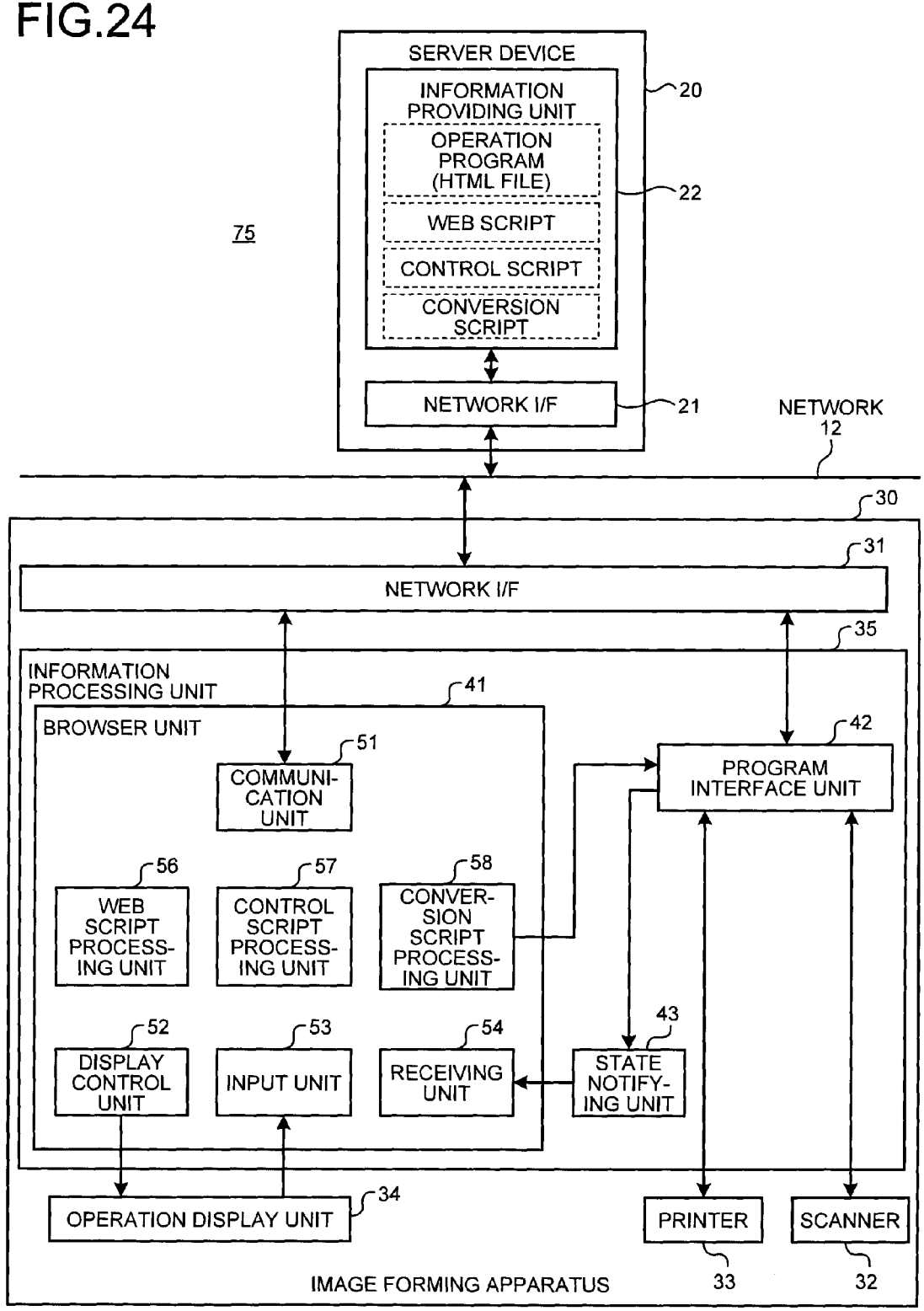
FIG. 24 is a diagram illustrating a configuration of an image forming system according to a second embodiment.

FIG. 24 is a diagram illustrating a configuration of an image forming system 75 according to a second embodiment. The image forming system 75 according to the second embodiment has substantially the same function and configuration as those of the image forming system 10 according to the first embodiment described above with reference to FIG. 1 to FIG. 23. Accordingly, components having substantially the same function and configuration as those of the image forming system 10 according to the first embodiment are denoted by the same reference numerals, and only differences will be described.

The image forming system 75 includes the server device 20 and the image forming apparatus 30. The information providing unit 22 of the server device 20 provides the operation program, a web script, a control script, and the conversion script to the image forming apparatus 30 via the network 12.

The web script and the control script are computer programs downloaded from the browser program to be executed on the browser program. In the embodiment, the web script and the control script are script programs executed on the browser program.

The information processing unit 35 executes the browser program and downloads the operation program (such as an HTML file), the web script, the control script, and the conversion script from the server device 20 on the browser program. The information processing unit 35 then executes the operation program, the web script, the control script, and the conversion script on the browser program to provide the user interface for operating the scanner 32 and the printer 33.

The browser unit 41 includes the communication unit 51, the display control unit 52, the input unit 53, the receiving unit 54, a web script processing unit 56, a control script processing unit 57, and the conversion script processing unit 58. The browser unit 41 is different from that in the first embodiment in that the browser unit 41 further includes the web script processing unit 56 and the control script processing unit 57.

The communication unit 51 acquires the operation program (such as an HTML file), the web script, the control script, and the conversion script from the server device 20. The operation program, the web script, the control script, and the conversion script are computer programs that provide the user interface for operating the scanner 32 and the printer 33 through the operation display unit 34.

The web script processing unit 56 functions by the processor executing the web script on the browser program. The web script is an application program described using a script language to be executed on the browser program. The web script processing unit 56 executes an operation described in the application program.

The control script processing unit 57 functions by the processor executing the control script on the browser program. The control script processing unit 57 gives the job generation request to the conversion script processing unit 58 corresponding to the operation instruction given by the web script processing unit 56. The control script processing unit 57 also issues the user interface information used for generating the user interface to the web script processing unit 56. As an example, when the event is issued, the control script processing unit 57 issues the user interface information corresponding to the event.

The conversion script processing unit 58 functions by the processor executing the conversion script on the browser program. In the embodiment, the conversion script processing unit 58 transmits the job generation request given by the control script processing unit 57 to the program interface unit 42 corresponding to the operation instruction from the user through the user interface. The conversion script processing unit 58 receives and stores the job ID from the program interface unit 42 corresponding to the job generation request transmitted to the program interface unit 42.

The conversion script processing unit 58 analyzes the state of the scanner 32 or the printer 33 based on the state data received by the receiving unit 54. The conversion script processing unit 58 then issues the event corresponding to the state of the scanner 32 or the printer 33 to the control script processing unit 57.

When the event is issued from the conversion script processing unit 58, the control script processing unit 57 issues the user interface information corresponding to the issued event. The web script processing unit 56 displays the user interface according to the user interface information issued from the control script processing unit 57. The display control unit 52 then provides the user interface via the operation display unit 34 corresponding to the control by the web script processing unit 56.

A hardware configuration of the image forming system 75 according to the second embodiment is the same as the hardware configuration illustrated in FIG. 2. When the processor such as the CPU 101 executes the operating system and the like stored in advance in the storage device 103, the information providing unit 22 of the server device 20 can provide the operation program, the web script, the control script, and the conversion script to the image forming apparatus 30.

In the information processing unit 35 of the image forming apparatus 30, the processor such as the CPU 111 downloads the operation program, the web script, the control script, and the conversion script from the server device 20 via the network 12, and loads and executes the operation program, the web script, the control script, and the conversion script on the memory 112. The operation program, the web script, the control script, and the conversion script have a module configuration including a display control module, an input module, a web script processing module, a control script processing module, and a conversion script processing module. When the processor such as the CPU 111 executes these modules, the information processing unit 35 is enabled to function as the display control unit 52, the input unit 53, the web script processing unit 56, the control script processing unit 57, and the conversion script processing unit 58.

Figure 25:
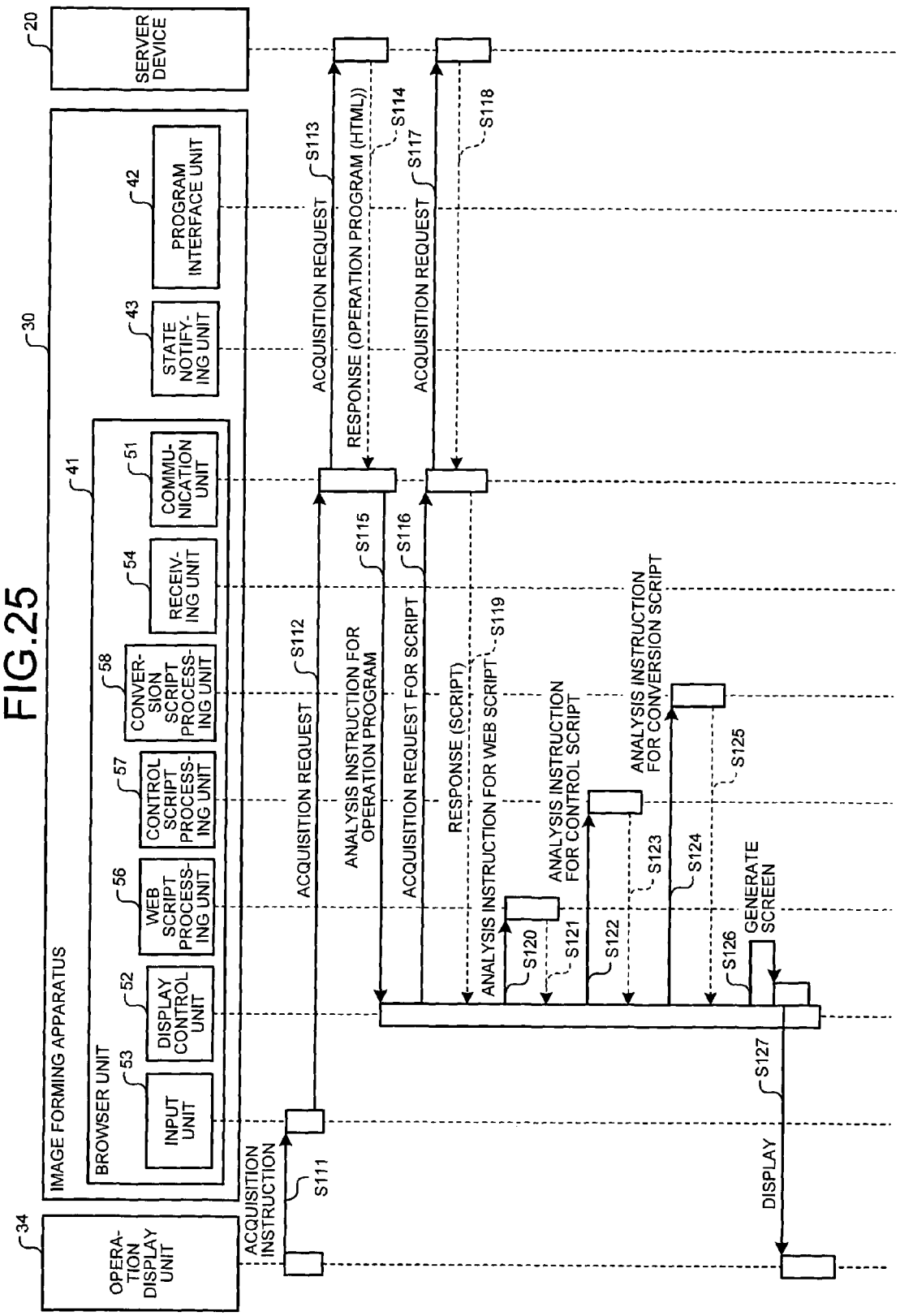
FIG. 25 is a sequence diagram of the image forming system according to the second embodiment when processing is started.

FIG. 25 is a sequence diagram of the image forming system 75 according to the second embodiment when processing is started. First, the user executes the browser program and inputs the URI and the like indicating the storage place of the HTML file serving as the operation program to the browser program to instruct to download the HTML file. When the download of the HTML file is instructed by the user, the operation display unit 34 gives the acquisition instruction to the input unit 53 of the browser unit 41 at Step S111. Subsequently, the input unit 53 gives the acquisition request to the communication unit 51 at Step S112.

The communication unit 51 then transmits the acquisition request for the HTML file to the server device 20 at Step S113. Next, the server device 20 transmits a response including the HTML file to the communication unit 51 at Step S114. Subsequently, the communication unit 51 extracts the HTML file from the response and gives the analysis instruction for the extracted HTML file to the display control unit 52 at Step S115.

When receiving the analysis instruction, the display control unit 52 analyzes the HTML file. The HTML file includes the call request for the web script, the control script, and the conversion script, and the URI indicating the storage place of each script. The display control unit 52 then gives the acquisition request for each script to the communication unit 51 at Step S116. When the HTML file includes an image file, CSS, other scripts, and the like as a result of analysis, the display control unit 52 also gives the acquisition request for those to the communication unit 51.

The communication unit 51 then transmits the acquisition request for each script to the server device 20 at Step S117. Next, the server device 20 transmits the response including the web script, the control script, the conversion script, and the like to the communication unit 51 at Step S118. Subsequently, the communication unit 51 transmits the response including each script to the display control unit 52 at Step S119.

When receiving the response to the acquisition request for each script, the display control unit 52 extracts the web script, the control script, and the conversion script from the response. Subsequently, the display control unit 52 gives the analysis instruction for the extracted web script to the web script processing unit 56 at Step S120. When receiving the analysis instruction, the web script processing unit 56 analyzes the web script and starts to execute the web script to start provision of an application on the browser program. Subsequently, after the analysis and the process for starting the provision is finished, the web script processing unit 56 transmits the response to the display control unit 52 at Step S121.

At Step S122, the display control unit 52 then gives the analysis instruction for the extracted control script to the control script processing unit 57. When receiving the analysis instruction, the control script processing unit 57 analyzes the control script and is caused to be in a standby state for execution of the control script. Subsequently, after the analysis is finished, the control script processing unit 57 transmits the response to the display control unit 52 at Step S123.

Subsequently, the display control unit 52 gives the analysis instruction for the extracted conversion script to the conversion script processing unit 58 at Step S124. When receiving the analysis instruction, the conversion script processing unit 58 analyzes the conversion script and is caused to be in a standby state for execution of the conversion script. Subsequently, after the analysis is finished, the conversion script processing unit 58 transmits the response to the display control unit 52 at Step S125.

The display control unit 52 then generates a screen including the user interface for controlling the scanner 32 and the printer 33 based on the analysis result of the HTML file at Step S126. Subsequently, the display control unit 52 displays the generated screen on the operation display unit 34 at Step S127.

Through the above processing, the information processing unit 35 can acquire the HTML file (operation program), the web script, the control script, and the conversion script from the server device 20. The information processing unit 35 can also display the screen for operating and controlling the scanner 32 and the printer 33 on the browser program.

Figure 26:
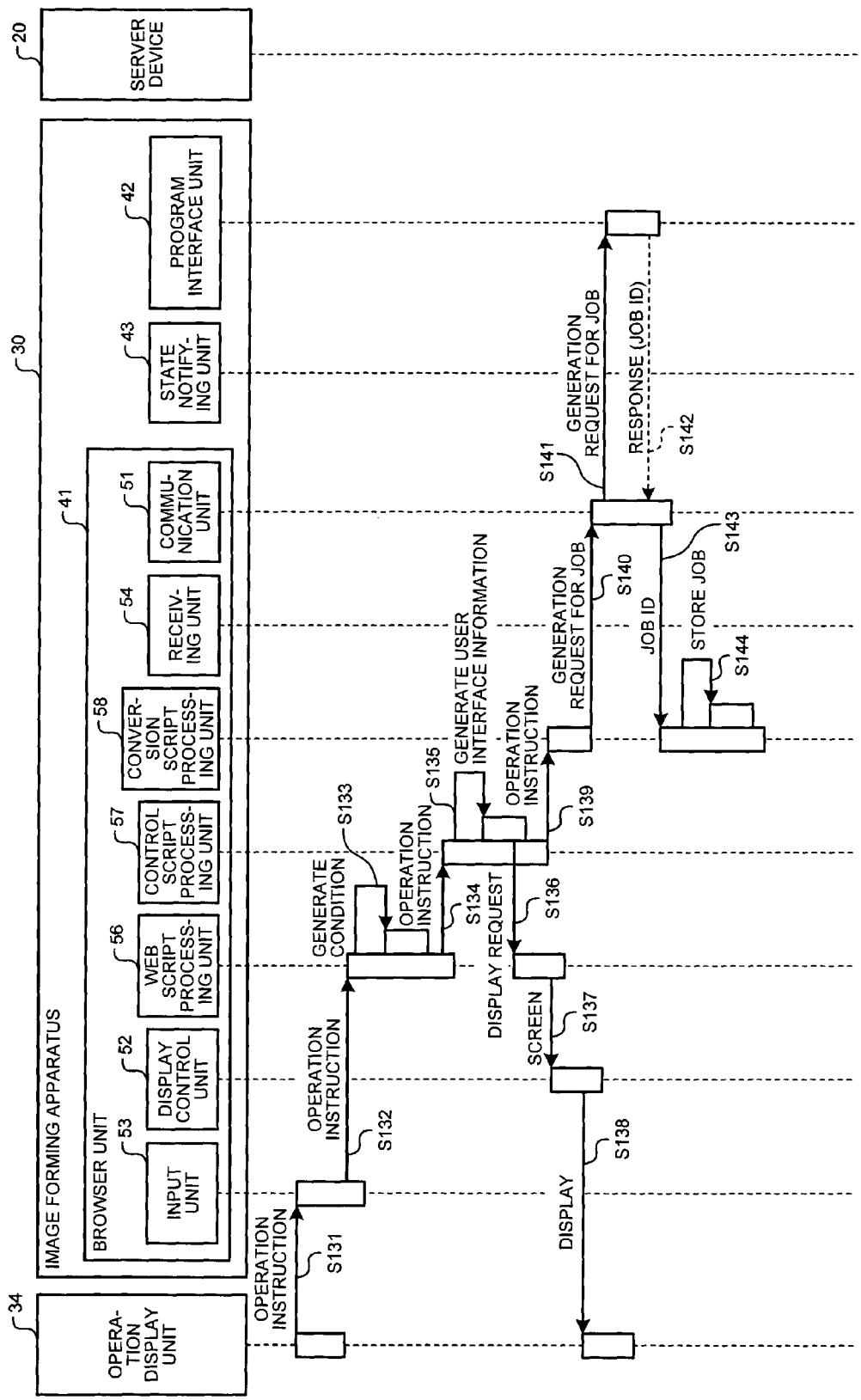
FIG. 26 is a sequence diagram of the image forming system according to the second embodiment when a job is generated.

FIG. 26 is a sequence diagram of the image forming system 75 according to the second embodiment when the job is generated. After the execution of the sequence illustrated in FIG. 25 is completed, the sequence illustrated in FIG. 26 is executed in the image forming system 75.

The user operates the user interface displayed on the operation display unit 34 to give the operation instruction for the scanner 32 or the printer 33 to the operation display unit 34. For example, the user operates the user interface to give, to the operation display unit 34, an operation starting instruction for the scanner or the printer and setting information such as a resolution or a distinction between monochrome and color.

When receiving such an operation instruction, first, the operation display unit 34 gives the operation instruction to the input unit 53 of the browser unit 41 at Step S131. The input unit 53 then gives the operation instruction to the web script processing unit 56 at Step S132. When receiving the operation instruction, the web script processing unit 56 generates an operation condition of the setting information such as a resolution or a distinction between monochrome and color at Step S133. At Step S134, the web script processing unit 56 then gives the operation instruction to the control script processing unit 57.

Subsequently, when receiving the operation instruction, the control script processing unit 57 executes the control script to generate the user interface information at Step S135. At Step S136, the control script processing unit 57 then gives a display request including the generated user interface information to the web script processing unit 56. At Step S137, the web script processing unit 56 then generates the user interface screen according to the user interface information included in the received display request and gives the user interface screen to the display control unit 52.

Subsequently, when receiving the user interface screen, the display control unit 52 displays the received screen on the operation display unit 34 at Step S138.

In contrast, when receiving the operation instruction from the web script processing unit 56, the control script processing unit 57 executes the control script and gives the received operation instruction to the conversion script processing unit 58 at Step S139. When receiving the operation instruction from the control script processing unit 57, the conversion script processing unit 58 then transmits a generation request for a job including processing content according to the operation instruction to the communication unit 51 at Step S140. The processing performed by the conversion script processing unit 58 when the job is generated is the same as that in the first embodiment. Subsequently, the communication unit 51 transmits the job generation request to the program interface unit 42 at Step S141. In response to the reception of the job generation request, the program interface unit 42 causes the scanner 32 or the printer 33 to execute the job according to the operation instruction.

At Step S142, the program interface unit 42 then transmits the response to the communication unit 51 according to causing the scanner 32 or the printer 33 to execute the job. In this case, when the job is successfully generated, the program interface unit 42 causes the response to include the job ID for identifying the generated job and the job information representing the execution state of the current job. The communication unit 51 then extracts the job ID and the job information from the received response, and transmits the job ID and the job information to the conversion script processing unit 58 at Step S143. Subsequently, when receiving the job ID and the job information, the conversion script processing unit 58 stores the job ID together with the job information in association with the job ID at Step S144.

Through the above processing, when receiving the operation instruction for the scanner 32 or the printer 33, the information processing unit 35 can display a user interface screen indicating in-operation. The information processing unit 35 can also cause the scanner 32 or the printer 33 to execute the job according to the operation instruction, and store the job ID for identifying the executed job and the job information representing the execution state of the job.

Figures 27, 28:
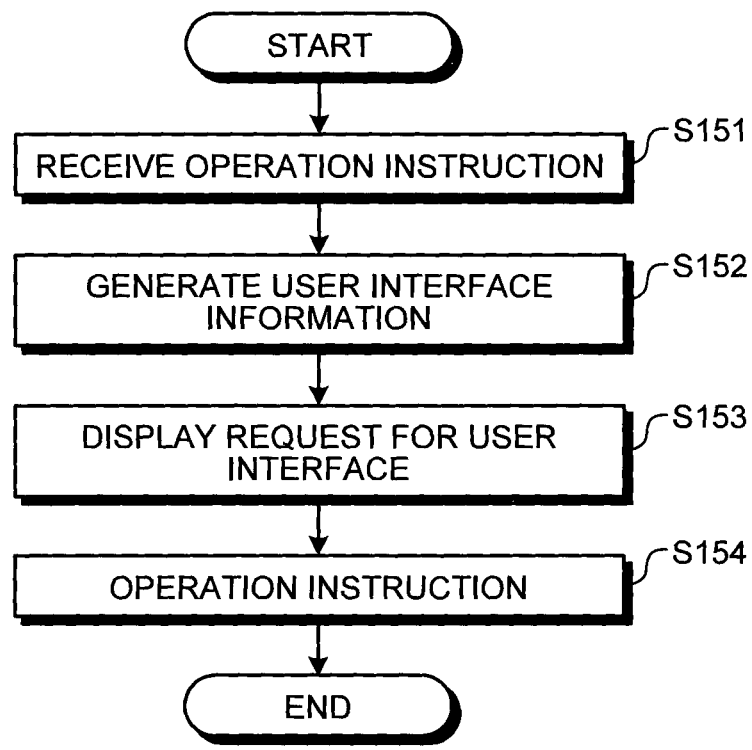
FIG. 27 is a diagram illustrating a processing flow of a control script processing unit when the job is generated.
FIG. 28 is a diagram illustrating an example of user interface information used for generating a user interface in scanning.

FIG. 27 is a diagram illustrating a processing flow of the control script processing unit 57 when the job is generated. When receiving the operation instruction from the web script processing unit 56, the control script processing unit 57 starts processing from Step S151.

First, at Step S151, the control script processing unit 57 receives the operation instruction. Next, at Step S152, the control script processing unit 57 generates the user interface information for generating the user interface screen indicating that the operation is being executed.

For example, when receiving the operation instruction to start scanning, the control script processing unit 57 generates the user interface information including a message of "scanning" and information representing that a canceling operation cannot be accepted as illustrated in FIG. 28. Details about the method of generating the user interface information will be further described with reference to FIG. 31.

Subsequently, at Step S153, the control script processing unit 57 gives the display request for the user interface to the web script processing unit 56. In this case, the user interface information generated at Step S152 is caused to be included in the display request.

At Step S154, the control script processing unit 57 then gives the received operation instruction to the conversion script processing unit 58. Subsequently, the control script processing unit 57 ends this procedure.

Figure 29:
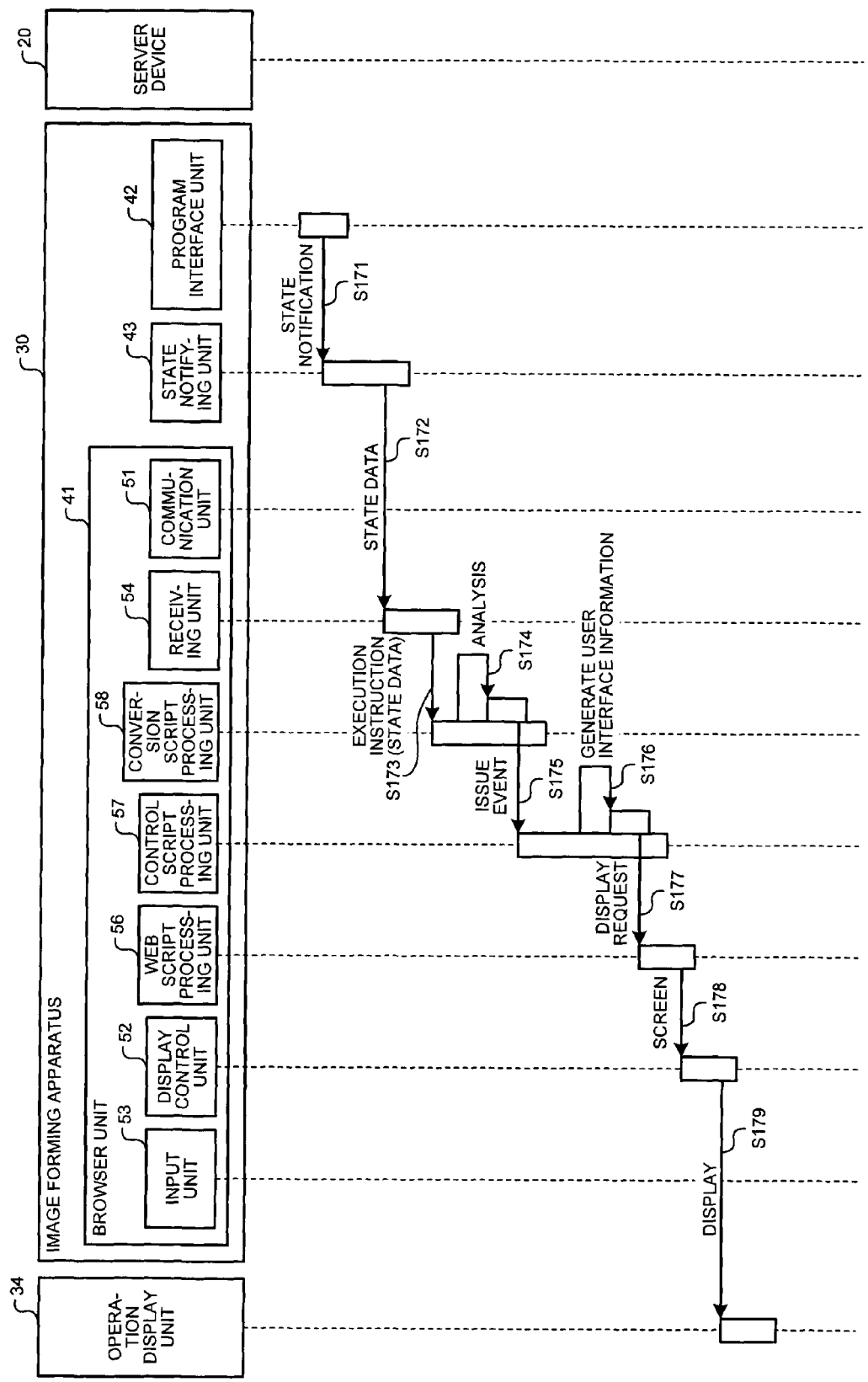
FIG. 29 is a sequence diagram of the image forming system according to the second embodiment when the event is issued.

FIG. 29 is a sequence diagram of the image forming system 75 according to the second embodiment when the event is issued. After the execution of the sequence illustrated in FIG. 26 is completed, the sequence illustrated in FIG. 29 is executed in the image forming system 75.

First, at Step S171, the program interface unit 42 notifies the state notifying unit 43 of the state of the scanner 32 or the printer 33 executing the job. As an example, the program interface unit 42 notifies the state when requested from the state notifying unit 43 or at regular intervals.

The state notifying unit 43 acquires the execution state of the job by the scanner 32 or the printer 33 due to the notification from the program interface unit 42. Subsequently, at Step S172, the state notifying unit 43 notifies the receiving unit 54 of the browser program of the state data including the job information representing the execution state of the job by the scanner 32 or the printer 33.

At Step S173, when the state data is notified from the state notifying unit 43, the receiving unit 54 then gives the execution instruction for the conversion script to the conversion script processing unit 58. In this case, the receiving unit 54 causes the execution instruction to include the state data.

Subsequently, at Step S174, the conversion script processing unit 58 executes the conversion script to analyze the execution state of the job based on the job information included in the state data. At Step S175, the conversion script processing unit 58 then issues the event corresponding to the execution state of the job to the control script processing unit 57 based on the execution state of the job represented in the job information. The processing performed by the conversion script processing unit 58 when the event is issued is the same as that in the first embodiment.

Subsequently, at Step S176, the control script processing unit 57 executes the control script, analyzes the event, and generates the user interface information. At Step S177, the control script processing unit 57 then gives the display request including the generated user interface information to the web script processing unit 56. At Step S178, the web script processing unit 56 generates the user interface screen according to the user interface information included in the received display request and gives the user interface screen to the display control unit 52.

When receiving the user interface screen, the display control unit 52 then displays the received screen on the operation display unit 34 at Step S179.

Through the above processing, the information processing unit 35 can acquire the execution state of the job by the scanner 32 or the printer 33 from the program interface unit 42. The information processing unit 35 can also give the event corresponding to the execution state of the job by the scanner 32 or the printer 33 to the display control unit 52. The information processing unit 35 generates the user interface information for the event corresponding to the execution state of the job. The information processing unit 35 then generates the user interface screen according to the generated user interface information. Accordingly, the information processing unit 35 can easily generate and display the user interface screen suitable for the execution state of the job.

Figure 30:
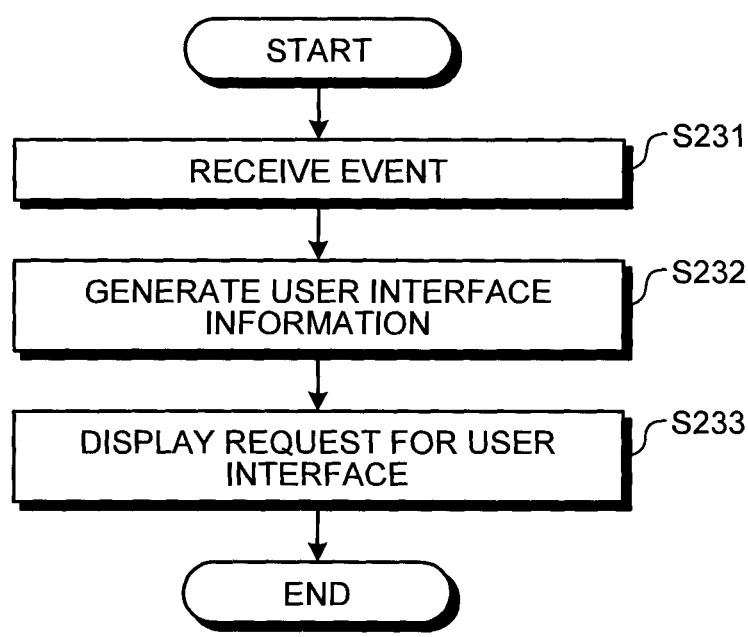
FIG. 30 is a diagram illustrating a processing flow of the control script processing unit when the event is issued.

FIG. 30 is a diagram illustrating a processing flow of the control script processing unit 57 when the event is issued. When receiving the event from the conversion script processing unit 58, the control script processing unit 57 starts processing from Step S231.

First, at Step S231, the control script processing unit 57 receives the event. Next, at Step S232, the control script processing unit 57 generates the user interface information used for generating the user interface corresponding to the event in response to issuance of the event. A detailed generation method will be further described with reference to FIG. 31.

Subsequently, at Step S233, the control script processing unit 57 gives the display request for the user interface to the web script processing unit 56. In this case, the user interface information generated at Step S232 is caused to be included in the display request. The control script processing unit 57 then ends this procedure.

Figure 31:
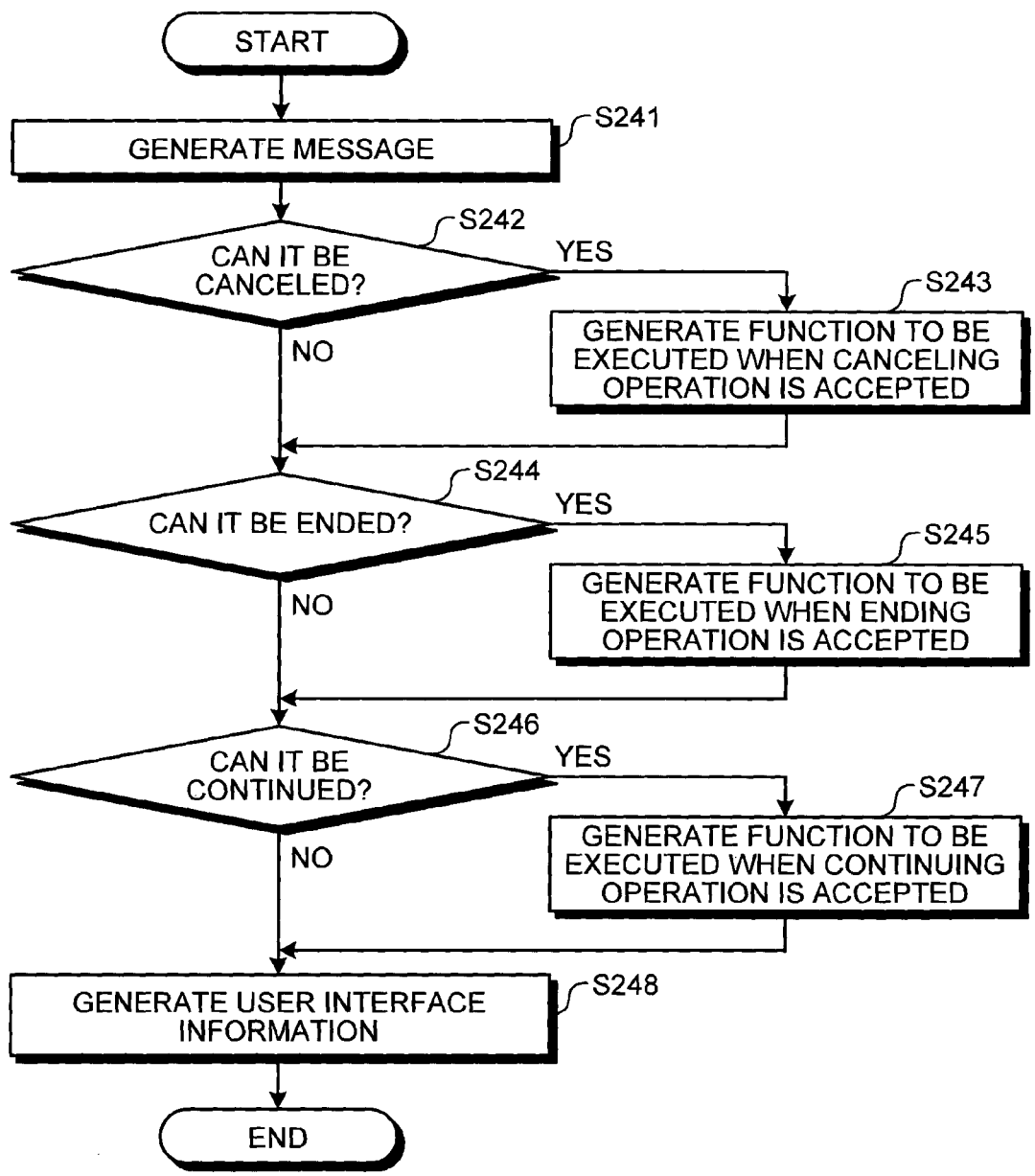
FIG. 31 is a diagram illustrating a generation processing flow of the user interface information in the control script processing unit when the event is issued.

FIG. 31 is a diagram illustrating a generation processing flow of the user interface information in the control script processing unit 57 when the event is issued. At Step S152 in FIG. 27 and at Step S232 in FIG. 30, the control script processing unit 57 generates the user interface information according to the procedure illustrated in FIG. 31, for example.

First, at Step S241, the control script processing unit 57 generates a message to be presented to the user in providing the user interface with reference to the event or the operation instruction. The control script processing unit 57 generates the message with reference to data created in advance corresponding to each event or each operation instruction.

At subsequent Steps S242 to S247, the control script processing unit 57 generates operation content that can be accepted from the user and a function to be executed when the operation is accepted depending on the user interface to be generated based on the event or the operation instruction.

Specifically, first, at Step S242, the control script processing unit 57 determines whether the user can perform the canceling operation through the user interface to be generated. If the user can perform the canceling operation (Yes at Step S242), the control script processing unit 57 generates a function to be executed when the canceling operation is accepted at Step S243. If the user cannot perform the canceling operation (No at Step S242), or when the process at Step S243 is ended, the control script processing unit 57 advances the process to Step S244.

At Step S244, the control script processing unit 57 determines whether the user can perform an ending operation through the user interface to be generated. If the user can perform the ending operation (Yes at Step S244), the control script processing unit 57 generates a function to be executed when the ending operation is accepted at Step S245. If the user cannot perform the ending operation (No at Step S244), or when the process at Step S245 is ended, the control script processing unit 57 advances the process to Step S246.

At Step S246, the control script processing unit 57 determines whether the user can perform a continuing operation through the user interface to be generated. If the user can perform the continuing operation (Yes at Step S246), the control script processing unit 57 generates a function to be executed when the continuing operation is accepted at Step S247. If the user cannot perform the continuing operation (No at Step S246), or when the process at Step S247 is ended, the control script processing unit 57 advances the process to Step S248.

Subsequently, at Step S248, the control script processing unit 57 creates the user interface information based on the information described above. The user interface information to be created includes the message to be presented to the user in providing the user interface, the operation content that can be accepted from the user, and the function to be executed when the operation is accepted. When the process at Step S248 is ended, the control script processing unit 57 ends this procedure.

FIG. 32 is a diagram illustrating an example of the user interface information used for generating the user interface corresponding to the event of waiting for a user operation.

For example, when waiting for an operation of setting an original by the user during a scanning operation by the scanner 32, the control script processing unit 57 generates the user interface information as illustrated in FIG. 32. The user interface information of FIG. 32 includes a message of "set next original". The user interface information of FIG. 32 includes the canceling operation, an operation for ending reading, and the continuing operation as operation content that can be accepted from the user. The user interface information of FIG. 32 includes the function to be executed when the canceling operation is accepted, the function to be executed when the operation for ending reading is accepted, and the function to be executed when the continuing operation is accepted.

As the user interface information, the control script processing unit 57 may further generate user interface information for generating the user interface to be provided when an error occurs, when a warning is given, when the process is normally finished, and the like.

FIG. 33 is a diagram illustrating an example of the user interface information used for generating the user interface corresponding to a paper jam occurrence event. The user interface information may further include identification information (ID) for identifying a state of equipment. For example, the control script processing unit 57 may include the ID for identifying a given event. Accordingly, the web script processing unit 56 is enabled to perform screen control more precisely. For example, even when acquiring the user interface information including the same message (for example, the same warning message), the web script processing unit 56 can perform processing of creating a different warning message for a certain warning.

As described above, when the conversion script processing unit 58 executes the conversion script, the image forming system 75 according to the embodiment analyzes the execution state of the job by the scanner 32 or the printer 33 and issues the event corresponding to the execution state. The control script processing unit 57 then generates the user interface information (such as a message and a function) required for generating the user interface corresponding to the event. Subsequently, the display control unit 52 executes the HTML file (operation program) to provide the user interface corresponding to the user interface information.

Accordingly, the image forming system 75 according to the embodiment can provide an appropriate user interface corresponding to the execution state of the job by the scanner 32 or the printer 33 by calling the control script and the conversion script created in advance as the HTML file. Accordingly, the image forming system 75 according to the embodiment can easily create the HTML file (operation program) and the like for providing the user interface without detailed knowledge for understanding the state of the scanner 32 and the printer 33.

In the embodiment, the conversion script processing unit 58 may issue not only the event corresponding to the execution state of the job but also an event corresponding to the state of the scanner 32 and the printer 33 not executing the job. The state notifying unit 43 monitors the state of the scanner 32 and the printer 33. When the state of the scanner 32 and the printer 33 is changed, the state notifying unit 43 notifies the browser program of the state data indicating the changed state. In this case, the sequence illustrated in FIG. 29 is performed to issue the event, issue the user interface information, and display the user interface.

Figure 34:
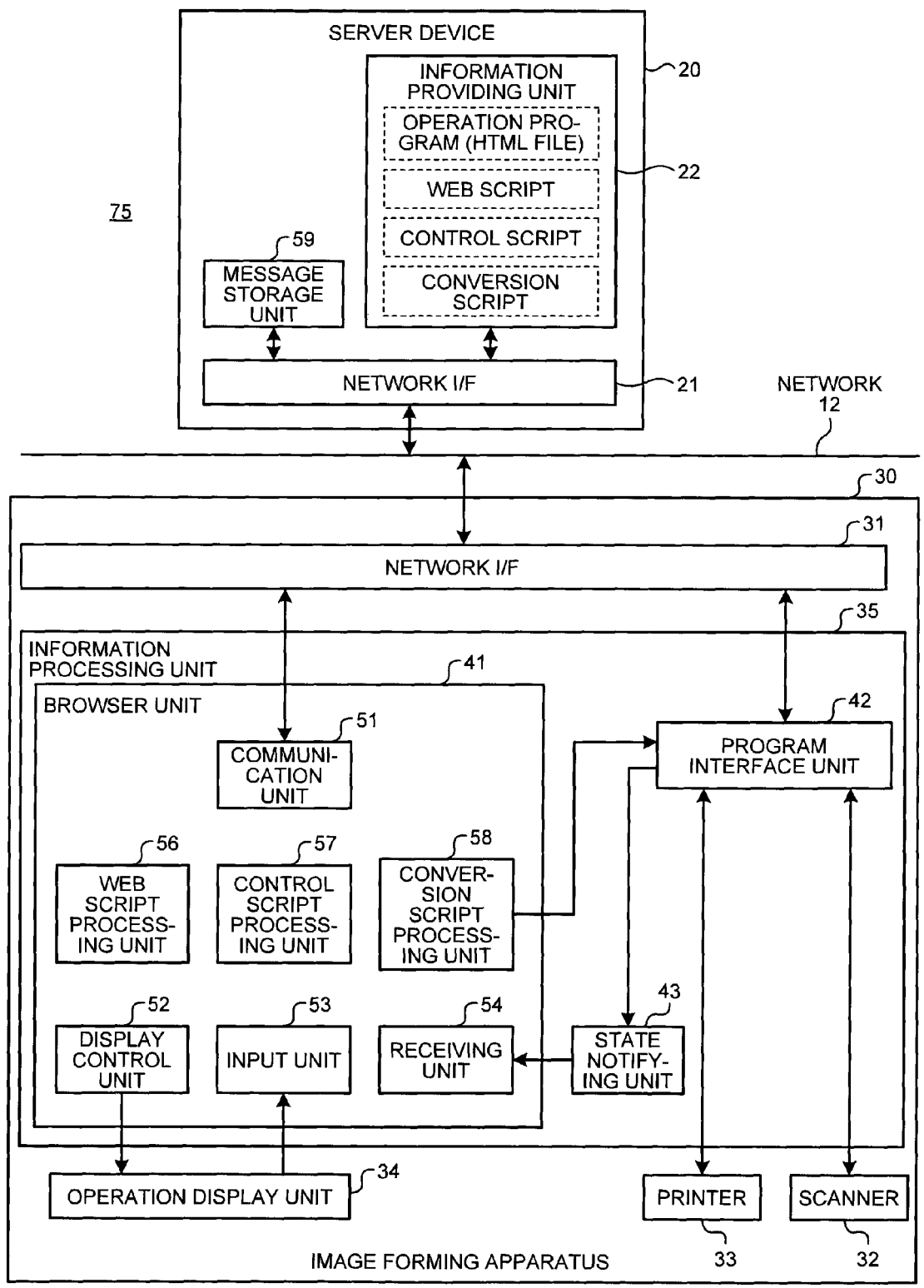
FIG. 34 is a diagram illustrating a configuration of the image forming system according to the first modification.

FIG. 34 is a diagram illustrating a configuration of the image forming system 75 according to a first modification of the second embodiment. In the first to third modifications of the second embodiment, components having the same function and configuration as those in FIG. 24 are denoted by the same reference numerals, and only differences will be described.

The server device 20 according to the first modification of the second embodiment further includes a message storage unit 59. The message storage unit 59 stores a plurality of messages to be included in the user interface information. The message storage unit 59 stores therein each message in association with identifying information (message ID). The messages included in the message storage unit 59 are downloaded together with the control script and the like by the information processing unit 35.

In the first modification of the second embodiment, the user interface information includes the message ID for identifying the message in the message storage unit 59 instead of the message. When receiving the user interface information, the web script processing unit 56 acquires the message based on the message ID and generates a screen.

In the image forming system 75 according to the first modification of the second embodiment, the control script and the message are separately stored, so that a developer and the like of the HTML file can change content of the message by rewriting the message in the message storage unit 59.

Figure 35:
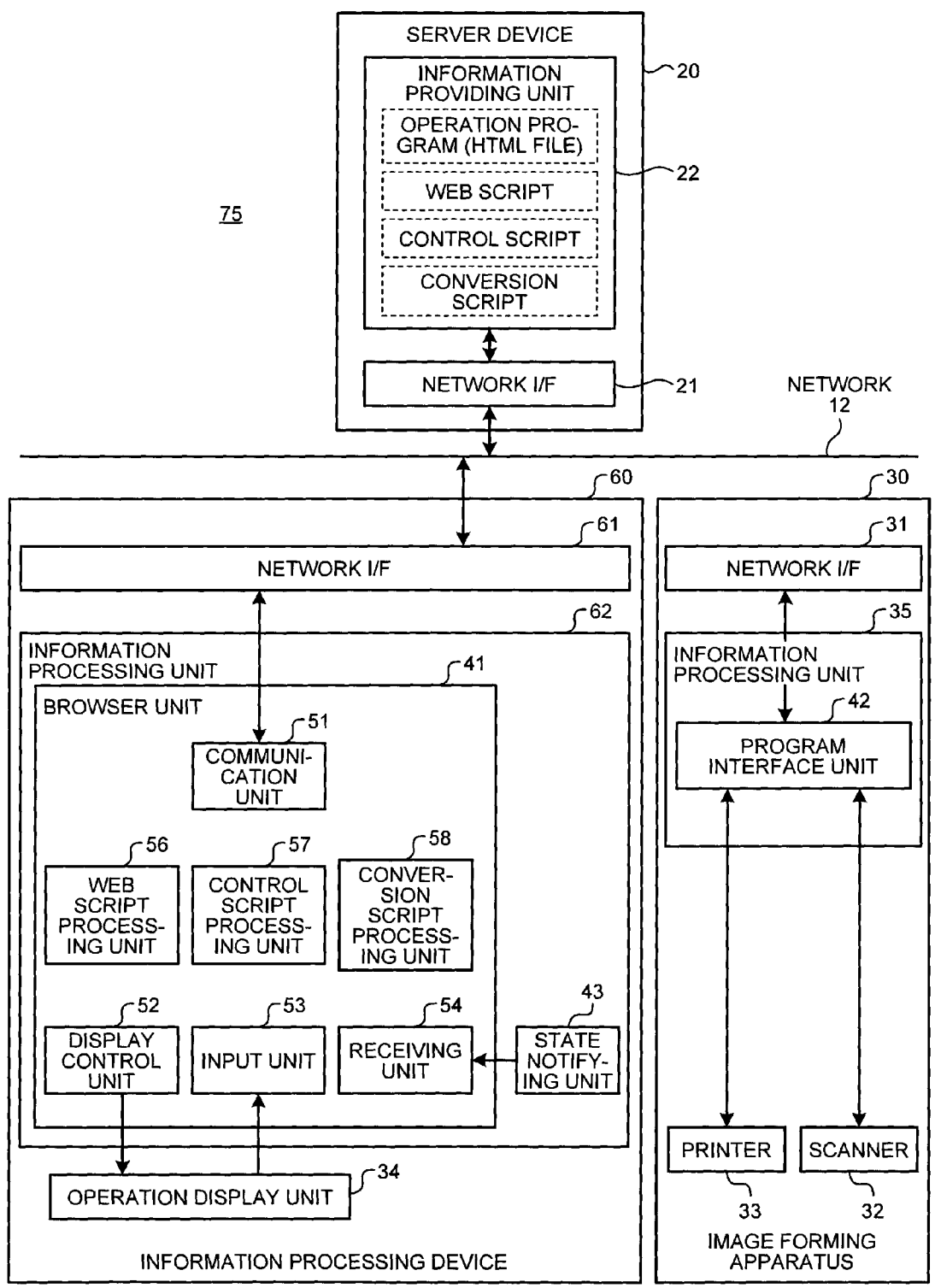
FIG. 35 is a diagram illustrating a configuration of an image forming system according to the second modification.

FIG. 35 is a diagram illustrating a configuration of the image forming system 75 according to the second modification of the second embodiment.

The image forming system 75 according to the second modification includes the server device 20, the image forming apparatus 30, and the information processing device 60. The image forming apparatus 30 according to the second modification includes the network I/F 31, the scanner 32, the printer 33, and the information processing unit 35, and does not include the operation display unit 34. The information processing unit 35 includes the program interface unit 42, and does not include the browser unit 41 and the state notifying unit 43.

The information processing device 60 includes the network I/F 61, the information processing unit 62, and the operation display unit 34. The network I/F 61 has the same function and configuration as those of the network I/F 31. The information processing unit 62 includes the browser unit 41 and the state notifying unit 43. A hardware configuration of the information processing unit 62 is the same as that of the information processing unit 35.

In the second modification of the second embodiment, the program interface unit 42 communicates with the browser unit 41 and the state notifying unit 43 via the network 12.

In the image forming system 75 according to the second modification of the second embodiment, the information processing device for operation can be separated from the image forming apparatus 30.

Figure 36:
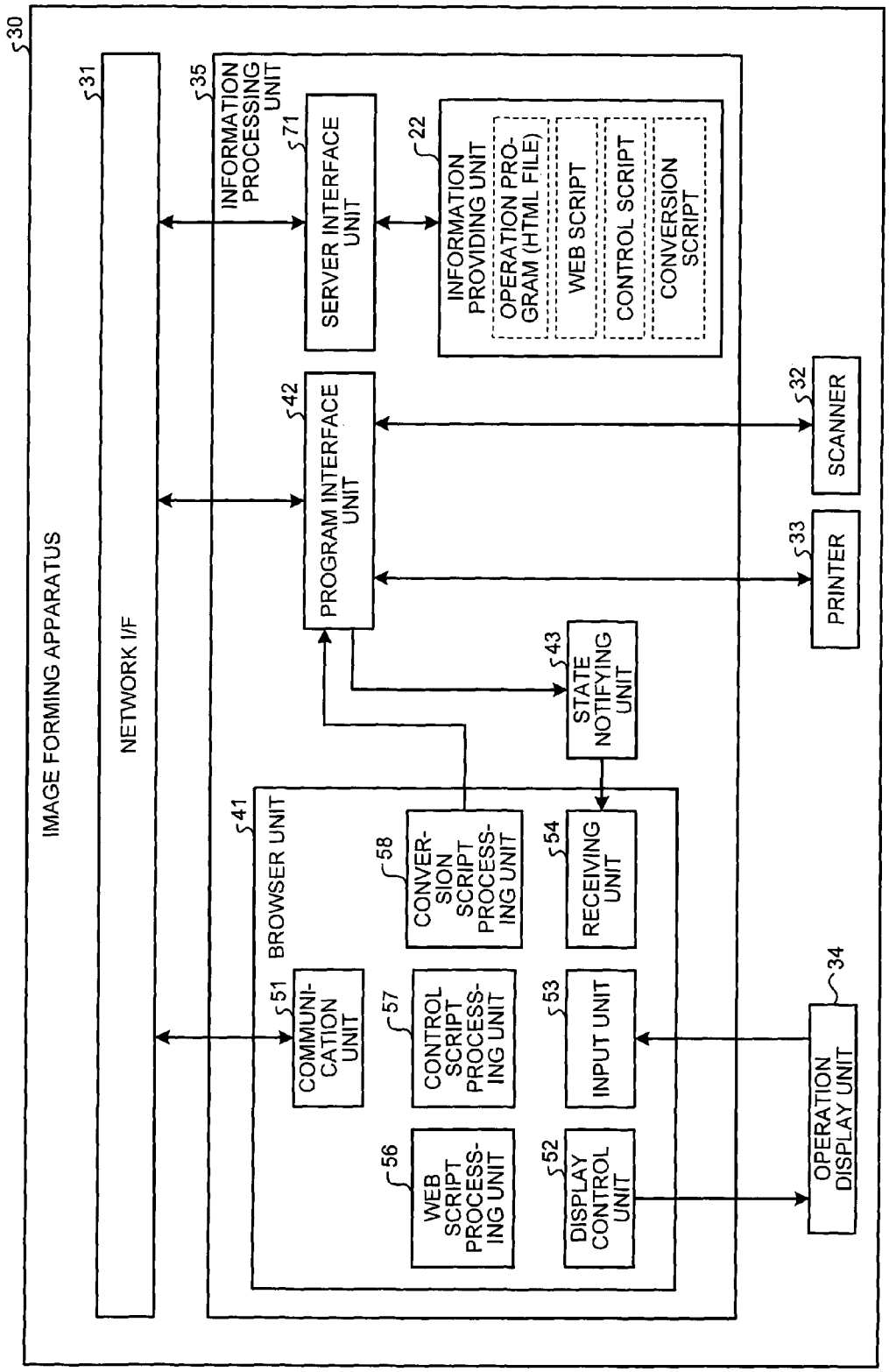
FIG. 36 is a diagram illustrating a configuration of an image forming apparatus according to a third modification.

FIG. 36 is a diagram illustrating a configuration of the image forming apparatus 30 according to the third modification of the second embodiment. The information processing unit 35 according to the third modification further includes the server interface unit 71 and the information providing unit 22.

The server interface unit 71 is a software interface to access the information providing unit 22 from the browser program. In the information processing unit 35, the scanner 32 and the printer 33, the information processing device for operation, and the information providing unit 22 that stores the operation program, the web script, the control script, and the conversion script are integrated with each other.

In the image forming apparatus 30 according to the third modification of the second embodiment, the operation program, the web script, the control script, and the conversion script can be acquired without accessing the server device 20 via the network 12.

Third Embodiment

Next, the following describes an image forming system 80 according to a third embodiment. The image forming system 80 according to the third embodiment has substantially the same function and configuration as those of the image forming system 75 according to the second embodiment described above with reference to FIG. 24 to FIG. 36. Accordingly, components having substantially the same function and configuration as those of the image forming system 75 according to the second embodiment are denoted by the same reference numerals, and only differences will be described.

Figure 37:
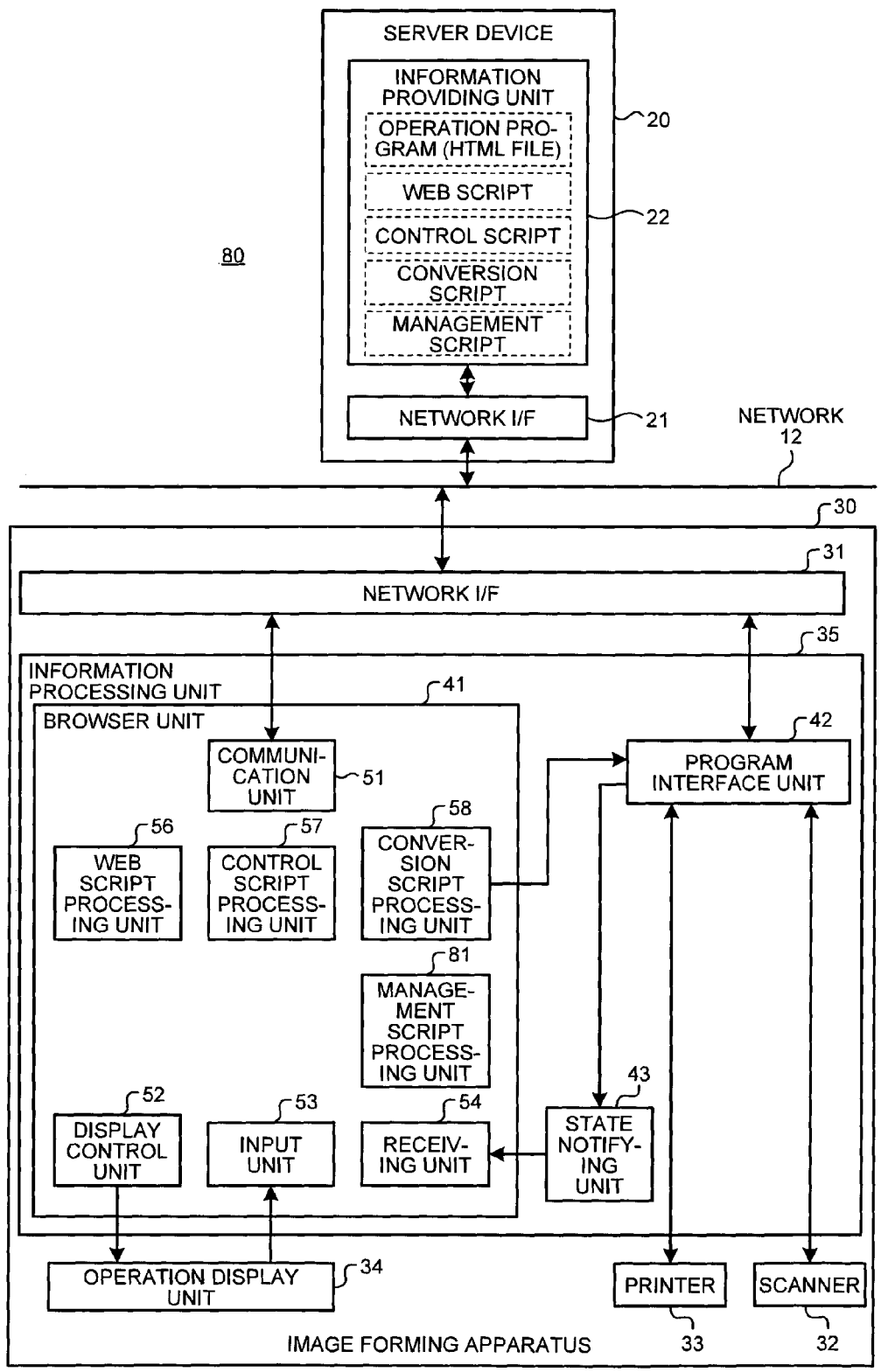
FIG. 37 is a diagram illustrating a configuration of an image forming system according to a third embodiment.

FIG. 37 is a diagram illustrating a configuration of the image forming system 80 according to the third embodiment. The information providing unit 22 included in the server device 20 provides a management script to the image forming apparatus 30 in addition to the operation program (such as an HTML file), the web script, the control script, and the conversion script via the network 12.

The management script is a computer program downloaded from the browser program to be executed on the browser program. In the embodiment, the management script is a script program executed on the browser program.

The information processing unit 35 included in the image forming apparatus 30 executes the browser program and further downloads the operation program, the web script, the control script, the conversion script, and the management script from the server device 20 on the browser program. The information processing unit 35 then executes these computer programs (such as the management script) on the browser program to provide the user interface for operating the scanner 32 and the printer 33.

The browser unit 41 further includes a management script processing unit 81. The communication unit 51 acquires the management script and the like from the server device 20.

The management script processing unit 81 functions by the processor executing the management script on the browser program. The management script processing unit 81 manages the issuing order of the events issued from the conversion script processing unit 58. More specifically, when the event generated by the conversion script processing unit 58 is an event that needs to be issued earlier than an event that has been issued, the management script processing unit 81 discards the event generated by the conversion script processing unit 58.

For example, the management script processing unit 81 manages, for each job, a table associating a plurality of events to be issued for the job with respective order values indicating the issuing order of the events in the job. The management script processing unit 81 then compares the order value of the event generated by the conversion script processing unit 58 with the order value associated with the event that has been issued to determine whether the generated event is the event that needs to be issued earlier than the event that has been issued. Accordingly, when the generated event is the event that needs to be issued earlier than the event that has been issued, the management script processing unit 81 can discard the event.

Figure 38:
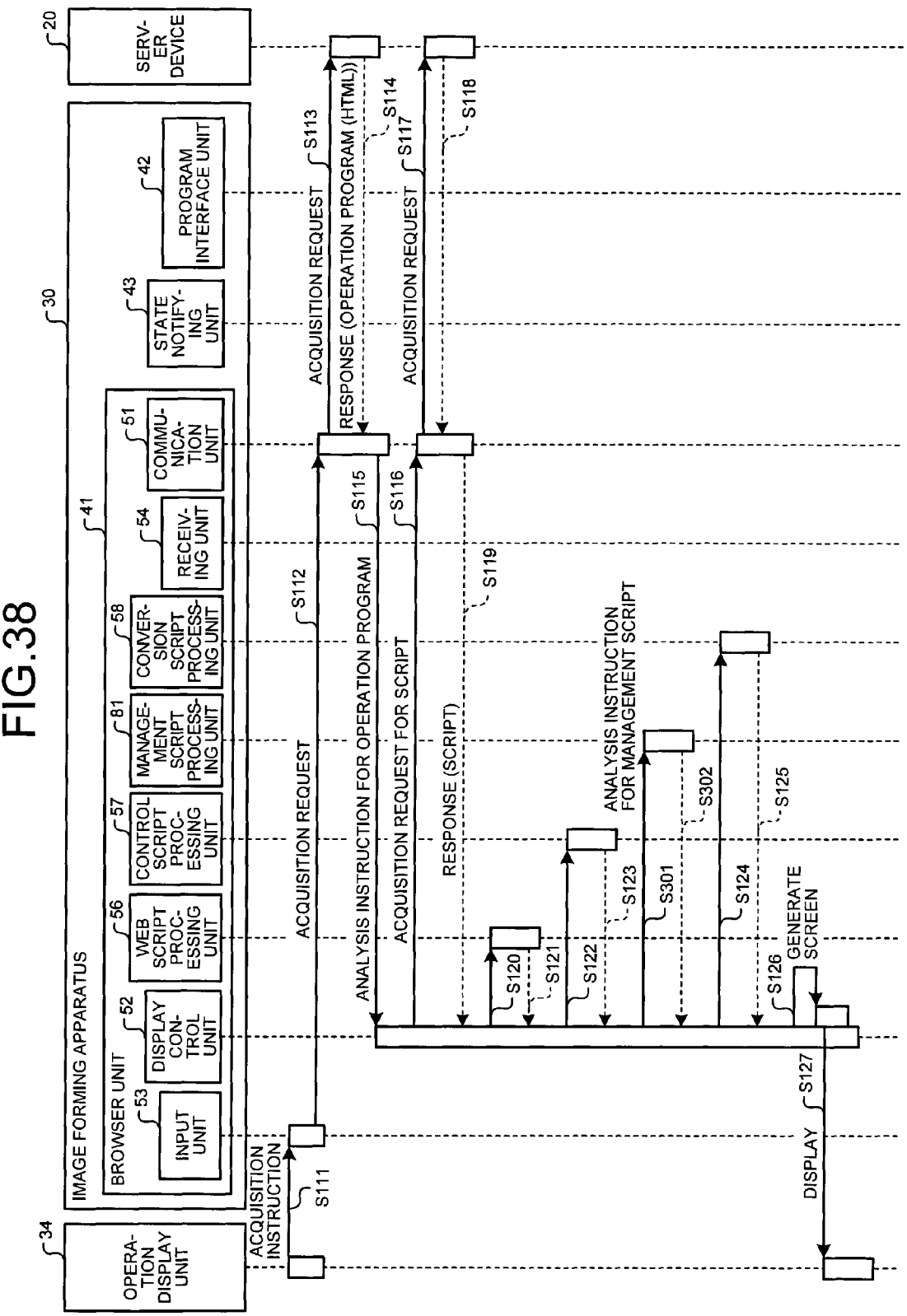
FIG. 38 is a sequence diagram of the image forming system according to the third embodiment when processing is started.

FIG. 38 is a sequence diagram of the image forming system 80 according to the third embodiment when processing is started. The sequence illustrated in FIG. 38 corresponds to the sequence illustrated in FIG. 25 according to the second embodiment.

In response to the acquisition request (S117) for the script from the image forming apparatus 30, the server device 20 transmits the response including the management script and the like to the communication unit 51 at Step S118. Subsequently, at Step S119, the communication unit 51 transmits the response including the management script and the like to the display control unit 52.

When receiving the response to the script acquisition request (S119), the display control unit 52 extracts the management script from the response. At Step S301, the display control unit 52 gives an analysis instruction for the extracted management script to the management script processing unit 81. When receiving the analysis instruction, the management script processing unit 81 analyzes the management script and is caused to be in a standby state for execution of the management script. Subsequently, after the analysis is finished, the management script processing unit 81 transmits the response to the display control unit 52 at Step S302.

By executing such a sequence, the information processing unit 35 can acquire the management script and the like from the server device 20 to be in the standby state for execution of the management script.

Figure 39:
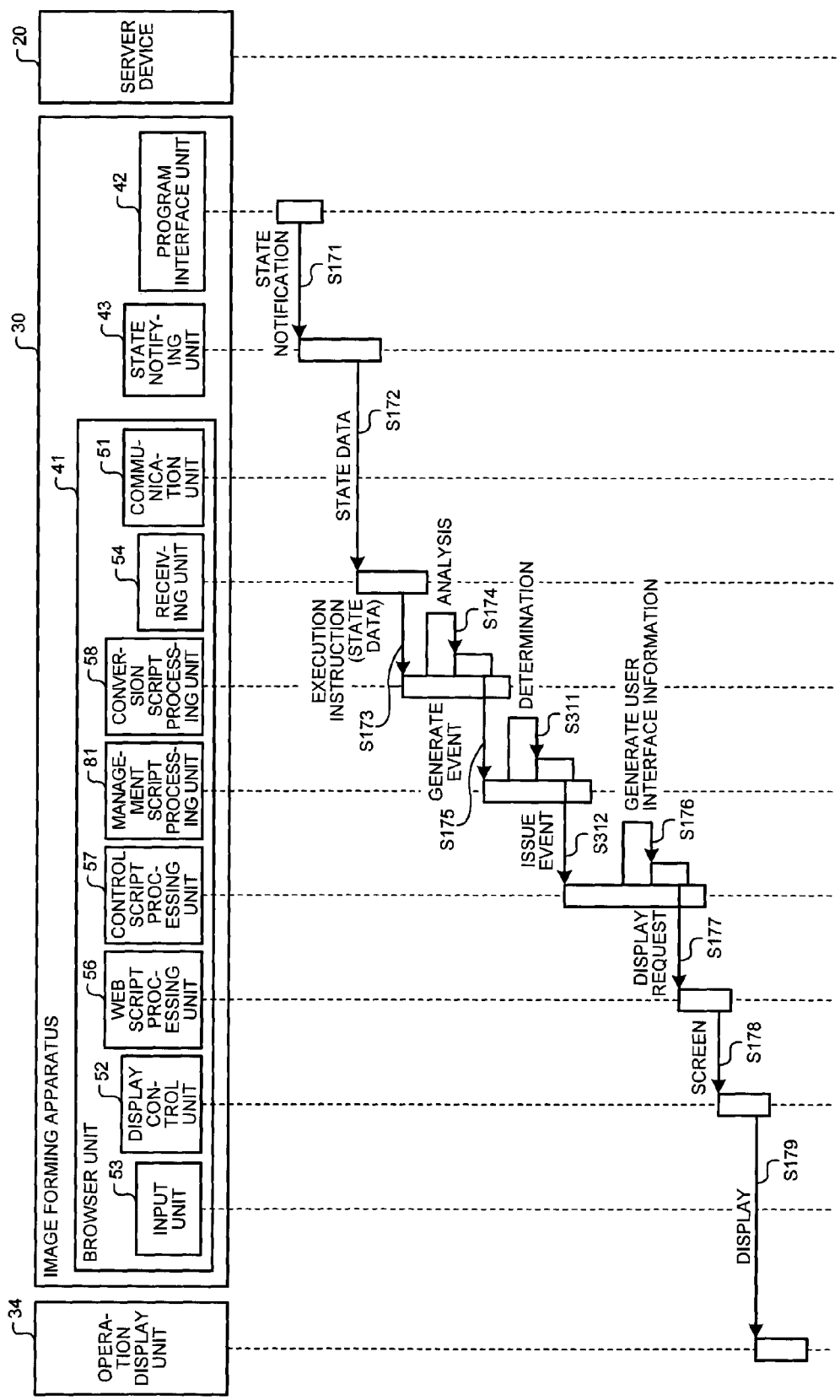
FIG. 39 is a sequence diagram of the image forming system according to the third embodiment when the event is issued.

FIG. 39 is a sequence diagram of the image forming system 80 according to the third embodiment when the event is issued. The sequence illustrated in FIG. 39 corresponds to the sequence illustrated in FIG. 29 according to the second embodiment.

At Step S175, the conversion script processing unit 58 generates the event based on the execution state of the job represented in the job information, and issues the generated event to the management script processing unit 81.

Subsequently, at Step S311, the management script processing unit 81 executes the management script to analyze the event generated by the conversion script processing unit 58, and determines whether the generated event is an event that needs to be issued earlier than the event that has been issued for the same job. When the generated event is the event that needs to be issued earlier than the event that has been issued for the same job, the management script processing unit 81 discards the event and ends the sequence.

When the event generated by the conversion script processing unit 58 is not the event that needs to be issued earlier than the event that has been issued for the same job, the management script processing unit 81 then issues the event to the control script processing unit 57 at Step S312. By executing such a sequence, the information processing unit 35 can generate and display the user interface screen in a predetermined order.

Figure 40:
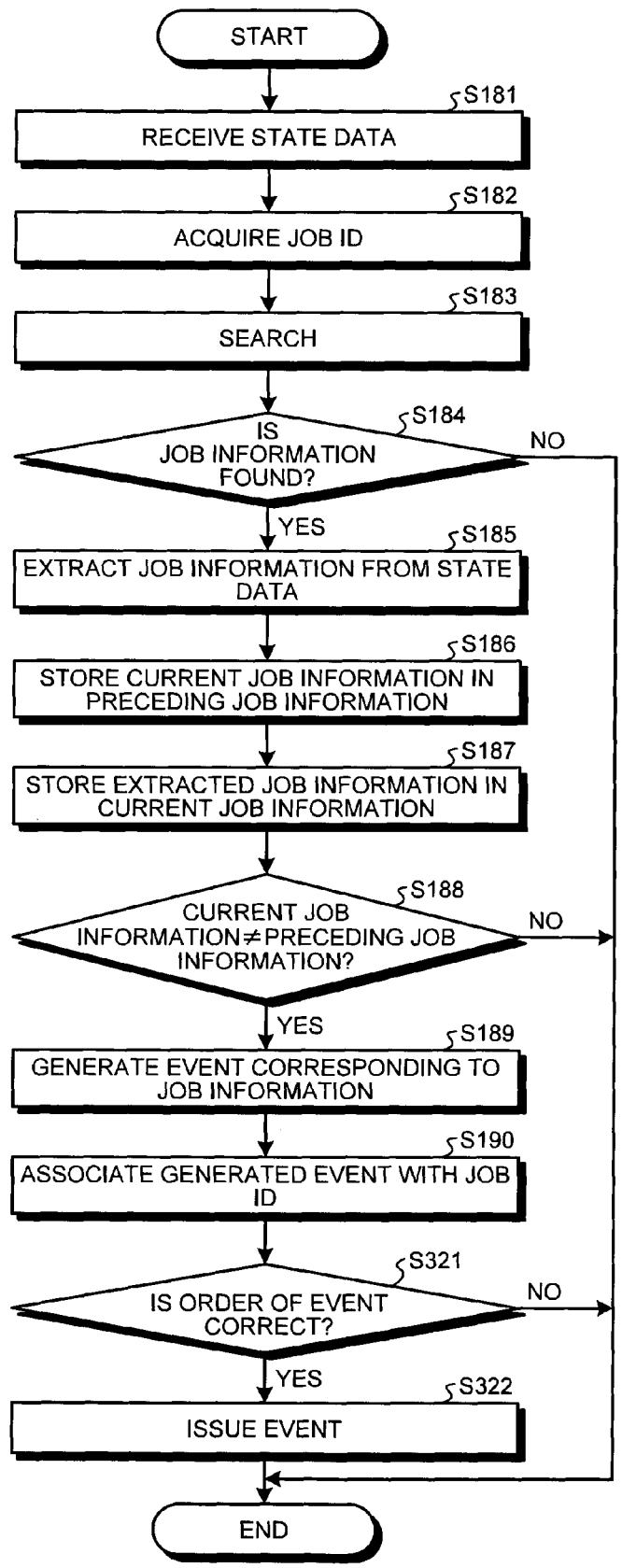
FIG. 40 is a diagram illustrating a processing flow of the conversion script processing unit and a management script processing unit when the event is issued.

FIG. 40 is a diagram illustrating a processing flow of the conversion script processing unit 58 and the management script processing unit 81 when the event is issued. The flowchart illustrated in FIG. 40 corresponds to the flowchart illustrated in FIG. 11.

In the third embodiment, at Step S181 to Step S190, the conversion script processing unit 58 performs the same processing as that at Step S61 to Step S70 in FIG. 11.

After ending the processing at Step S190, the conversion script processing unit 58 issues the generated event to the management script processing unit 81. When receiving the event from the conversion script processing unit 58, the management script processing unit 81 performs processing at Step S321.

At Step S321, the management script processing unit 81 determines whether the order of the event is correct. That is, the management script processing unit 81 determines whether the generated event is the event that needs to be issued earlier than the event that has been issued for the same job. If the order of the generated event is not correct (No at Step S321), the management script processing unit 81 ends this procedure.

If the order of the generated event is correct (Yes at Step S321), the management script processing unit 81 advances the process to Step S322. Subsequently, at Step S322, the management script processing unit 81 issues the event generated by the conversion script processing unit 58 to the display control unit 52. After issuing the event, the management script processing unit 81 ends this procedure.

Figures 41, 42:
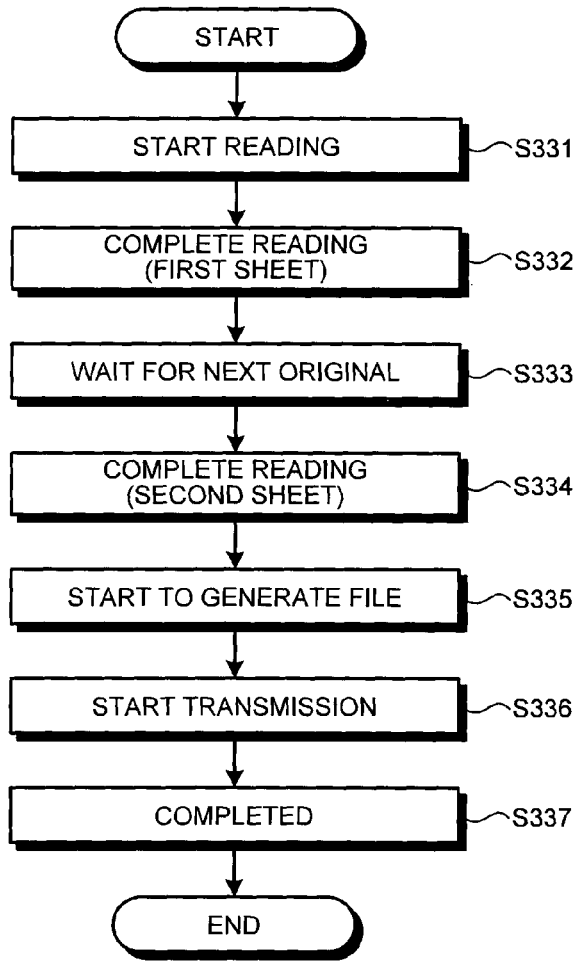
FIG. 41 is a diagram illustrating an example of issuing order of the events issued in a scanner job.
FIG. 42 is a diagram illustrating a table representing a correspondence relation between order values and the events issued in the scanner job.

FIG. 41 is a diagram illustrating an example of the issuing order of the events issued in a scanner job.

When a scanner job generation request is given to the scanner 32, the conversion script processing unit 58 issues the event in the order as illustrated in FIG. 41, for example. That is, the conversion script processing unit 58 first issues a reading start event (S331), then issues a reading completion event for the first sheet (S332), and issues an event of waiting for the next original (S333). When the user sets the next original, the scanner 32 performs scanning.

Subsequently, the conversion script processing unit 58 issues a reading completion event for the second sheet (S334). When the user performs an operation for ending reading, the conversion script processing unit 58 issues a file generation start event (S335), and then issues a transmission start event (S336). At the end, the conversion script processing unit 58 issues a completion event (S337).

The conversion script processing unit 58 receives the state of the scanner 32 via the program interface unit 42 and the state notifying unit 43, and issues the event corresponding to the received state. Accordingly, even when the state of the scanner 32 is changed, information may not be immediately notified to the conversion script processing unit 58, pieces of information representing two continuous states may be notified at the same time, or the order of pieces of information representing two continuous states may be replaced with each other.

In this case, for example, the conversion script processing unit 58 cannot issue the event in the correct order as illustrated in FIG. 41, and may issue the transmission start event (S336) after issuing the completion event (S337), for example. Accordingly, the web script processing unit 56 may display the user interface indicating "transmitting" even when the transmission of the file is completed.

However, in the third embodiment, the information processing unit 35 includes the management script processing unit 81. The management script processing unit 81 determines whether the event generated by the conversion script processing unit 58 is the event that needs to be issued earlier than the event that has been issued. If the event generated by the conversion script processing unit 58 is the event that needs to be issued earlier than the event that has been issued, the management script processing unit 81 then discards the event. Due to this, the management script processing unit 81 can prevent the event from being issued in incorrect order.

FIG. 42 is a diagram illustrating a table representing a correspondence relation between the order value and the event issued in the scanner job. As an example, the management script processing unit 81 holds a management table as illustrated in FIG. 42, and manages the issuing order of the events.

The management table associates, for each job, a plurality of events to be issued for the job with the respective order values indicating the issuing order of the events in the job.

As an example of the order value, a small value is allocated to the event that needs to be issued earlier, and a large value is allocated to the event that needs to be issued later. For example, assuming that the order value of the event to be issued first is 1, the order value is allocated such that the order value of the event to be issued next is 2, and the order value of the event to be subsequently issued is 3. As the order value, a small value may be allocated to the event that needs to be issued later.

In addition, the same order value may be allocated to a plurality of events. Any of the events to which the same order value is allocated may be executed first.

When holding such a management table, the management script processing unit 81 stores the order value of the event that has been issued immediately before. The management script processing unit 81 then compares the order value of the current event generated by the conversion script processing unit 58 with the order value associated with the preceding issued event to determine whether the order value of the current event is equal to or larger than the order value of the preceding event.

If the order value of the current event is equal to or larger than the order value of the preceding event, the management script processing unit 81 issues the current event. If the order value of the latest event is smaller than the order value of the preceding event, the management script processing unit 81 discards the current event. Due to this, the management script processing unit 81 can determine whether the generated event is the event that needs to be issued earlier than the event that has been issued.

When the event generated by the conversion script processing unit 58 is discarded, the management script processing unit 81 may issue information representing that the generated event is not the latest event, and notify the control script processing unit 57 or the web script processing unit 56 of the information. Accordingly, a developer and the like of the HTML file may cause the user interface including more detailed information to be displayed or controlled based on the information representing that the generated event is not the latest event.

The embodiments described above are exemplary only, and do not intend to limit the scope of the invention. The embodiments may be implemented in other various modes.

As an aspect of the present invention, a computer program as follows may be provided. That is, provided is a computer program executed by an information processing device for operating equipment, in which: the information processing device includes an operation display unit that displays information for a user and receives an input from the user, and an information processing unit including a processor that executes a browser program; the computer program includes an operation program and a conversion script that provide a user interface for operating the equipment through the operation display unit; the conversion script is executed by the processor on the browser program to analyze a state of the equipment and issue an event corresponding to the state of the equipment; and the operation program is executed by the processor on the browser program to provide the user interface corresponding to the event from the operation display unit when the event is issued.

The computer program may include an operation program, a control script, and a conversion script that provide a user interface for operating the equipment through the operation display unit, in which: the conversion script is executed by the processor on the browser program to analyze the state of the equipment and issue an event corresponding to the state of the equipment; the control script is executed by the processor on the browser program to issue user interface information used for generating the user interface corresponding to the event when the event is issued; and the operation program is executed by the processor on the browser program to provide the user interface according to the user interface information through the operation display unit corresponding to the issue of the user interface information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

10 Image forming system
12 Network
20 Server device
21 Network I/F
22 Information providing unit
30 Image forming apparatus
31 Network I/F
32 Scanner
33 Printer
34 Operation display unit
35 Information processing unit
41 Browser unit
42 Program interface unit
43 State notifying unit
51 Communication unit
52 Display control unit
53 Input unit
54 Receiving unit
56 Web script processing unit
57 Control script processing unit
58 Conversion script processing unit
59 Message storage unit
60 Information processing device
61 Network I/F
62 Information processing unit
71 Server interface unit
80 Image forming system
81 Management script processing unit
101 CPU
102 Memory
103 Storage device
111 CPU
112 Memory
113 Storage device
114 Device I/F

PRIOR ART DOCUMENT

Patent Literature

Patent Literature 1: Japanese Patent Application Laid-open No. 2012-105071

The invention claimed is:

1. An information processing device for operating equipment, the information processing device comprising:
   an operation display that displays information for a user and receives an input from the user; and
   processing circuitry that executes a browser program and is configured to:
   acquire, from a server, an operation program and a conversion script, the conversion script providing a user interface for operating the equipment through the operation display and an interface program that controls execution of a job on the equipment and analyzes a state of the equipment;
   execute the conversion script on the browser program and receive an execution request of the job by the user through the user interface;
   execute the conversion script on the browser program to analyze a state of the equipment and issue an event corresponding to the state of the equipment; and
   execute the operation program on the browser program to provide the user interface corresponding to the event through the operation display in response to issuance of the event, wherein
   the processing circuitry is further configured to acquire a control script, execute the control script on the browser program and issue user interface information used for generating the user interface corresponding to the event in response to issuance of the event, and provide the user interface according to the user interface information through the operation display in response to issuance of the user interface information,
   the processing circuitry further executes the interface program, which is configured to control execution of the job on the equipment through the browser program, wherein the processing circuitry is configured to transmit a generation request for the job to the interface program in response to an operation instruction from the user through the user interface, and the interface program is configured to cause the equipment to execute the job in response to reception of the generation request for the job, without further interaction with the server after receiving the conversion script from the server.

2. The information processing device according to claim 1, wherein the interface program is further configured to transmit a job ID for identifying the job to the processing circuitry, and the processing circuitry is further configured to receive and store the job ID.

3. The information processing device according to claim 2, wherein the processing circuitry is configured to acquire an execution state of the job from the program interface and notify the browser program of state data including job information representing the execution state of the job, and issue an event corresponding to the execution state of the job based on the state data.

4. The information processing device according to claim 3, wherein the processing circuitry is configured to store the job information included in the state data for each job ID, and issue an event corresponding to the execution state of the job when there is a change in the job information as compared with preceding job information stored for the same job ID, in response to acquisition of the job information included in the state data.

5. The information processing device according to claim 1, wherein the processing circuitry is further configured to acquire a management script, and execute the management script on the browser program and manage an issuing order of events issued from execution of the conversion script.

6. The information processing device according to claim 5, wherein, when the event generated by the processing circuitry is an event that needs to be issued earlier than an event that has been issued, the processing circuitry discards the generated event.

7. The information processing device according to claim 6, wherein the processing circuitry stores a management table associating, for each job, a plurality of events to be issued with respective order values indicating the issuing order of the events, and compares an order value of the event generated by the processing circuitry with an order value associated with an event that has been issued to determine whether the generated event is an event that needs to be issued earlier than the event that has been issued.

8. An information processing method executed by an information processing device that operates equipment, the information processing device including an operation display that displays information for a user and receives an input from the user, and processing circuitry that executes a browser program, the information processing method comprising:

acquiring, from a server, an operation program and a conversion script, the conversion script providing a user interface for operating the equipment through the operation display by the processing circuitry executing the browser program and an interface program that controls execution of a job on the equipment and analyzes a state of the equipment;

executing the conversion script on the browser program and receiving an execution request of the job by the user through the user interface;

analyzing a state of the equipment and issuing an event corresponding to the state of the equipment by the processing circuitry executing the conversion script on the browser program; and providing the user interface corresponding to the event through the operation display in response to issuance of the event by the processing circuitry executing the operation program on the browser program, wherein a control script is further acquired in the acquiring step, and the information processing method further includes issuing user interface information used for generating the user interface corresponding to the event in response to issuance of the event by the processing circuitry executing the control script on the browser program, the user interface according to the user interface information is provided through the operation display in response to issuance of the user interface information, control of an operation of the equipment through the browser program is performed by the program interface executed by the processing circuitry, and the method further including transmitting, by the processing circuitry, a generation request for a job to the program interface in response to an operation instruction from the user through the user interface, and causing, by the program interface, the equipment to execute the job in response to reception of the generation request for the job, without further interaction with the server after receiving the conversion script from the server.

* * * * *